United States Patent
Barnes

(10) Patent No.: US 7,575,677 B1
(45) Date of Patent: Aug. 18, 2009

(54) ENVIRONMENTALLY FRIENDLY WATER EXTRACTION DEVICE

(76) Inventor: William Roy Barnes, 14737 Covello St., Van Nuys, CA (US) 91405-1806

( * ) Notice: Subject to any disclaimer, the term of this patent is extended or adjusted under 35 U.S.C. 154(b) by 271 days.

(21) Appl. No.: 11/805,132

(22) Filed: May 22, 2007

Related U.S. Application Data

(60) Provisional application No. 60/802,639, filed on May 23, 2006.

(51) Int. Cl.
*B01D 35/02* (2006.01)
(52) U.S. Cl. ............ 210/232; 210/170.01; 210/170.02; 210/170.09; 210/460; 210/499; 210/172.3
(58) Field of Classification Search ...................... None
See application file for complete search history.

(56) References Cited

U.S. PATENT DOCUMENTS

| | | | | | |
|---|---|---|---|---|---|
| 539,800 | A | * | 5/1895 | Durant | 210/460 |
| 705,364 | A | * | 7/1902 | Kurtz | 210/170.01 |
| 756,517 | A | * | 4/1904 | Miller | 137/140 |
| 857,519 | A | * | 6/1907 | Foster | 210/460 |
| 882,098 | A | * | 3/1908 | Chial | 137/342 |
| 1,378,929 | A | * | 5/1921 | Wurscher | 210/463 |
| 1,451,394 | A | * | 4/1923 | Hurst | 210/162 |
| 1,694,743 | A | * | 12/1928 | Hinman | 210/460 |
| 1,722,626 | A | * | 7/1929 | Dean | 210/247 |
| 1,945,824 | A | * | 2/1934 | Saxe | 210/460 |
| 1,953,331 | A | * | 4/1934 | Armstrong | 169/52 |
| 1,967,785 | A | * | 7/1934 | Schacht | 210/463 |
| 1,971,733 | A | * | 8/1934 | Shimer | 210/448 |
| 2,015,274 | A | * | 9/1935 | Johnston | 210/250 |
| 2,249,020 | A | * | 7/1941 | McFarlin | 210/460 |
| 2,270,116 | A | * | 1/1942 | Featherston et al. | 210/460 |
| 2,300,952 | A | * | 11/1942 | May | 210/456 |
| 2,311,708 | A | * | 2/1943 | Sundholm | 251/149.8 |
| 2,331,332 | A | * | 10/1943 | Latta | 55/373 |
| 2,371,895 | A | * | 3/1945 | Kingman | 210/457 |
| 2,374,756 | A | * | 5/1945 | Kisch | 210/460 |
| 2,490,443 | A | * | 12/1949 | Knipper | 210/315 |
| 2,503,455 | A | * | 4/1950 | Sheren | 210/318 |
| 2,512,877 | A | * | 6/1950 | Rike | 210/172.2 |
| 2,580,209 | A | * | 12/1951 | Wiley | 210/460 |
| 2,754,003 | A | * | 7/1956 | Fenner | 210/134 |
| 2,783,893 | A | * | 3/1957 | Romanoff | 210/463 |
| 2,877,903 | A | * | 3/1959 | Veres | 210/462 |
| 2,957,579 | A | * | 10/1960 | McCombie | 210/242.1 |
| 3,037,636 | A | * | 6/1962 | McFarlin | 210/429 |
| 3,108,440 | A | * | 10/1963 | Anderson | 405/90 |
| 3,109,812 | A | * | 11/1963 | Mcaulay et al. | 210/242.1 |
| 3,117,584 | A | * | 1/1964 | Elenbaas | 134/168 R |
| 3,163,229 | A | * | 12/1964 | Salisbury | 166/234 |
| 3,206,036 | A | * | 9/1965 | Hawley | 210/460 |

(Continued)

*Primary Examiner*—Robert James Popovics
(74) *Attorney, Agent, or Firm*—Peter Ganjian

(57) ABSTRACT

An aquatic extraction and filtration device, comprising a portable frame, a screen enclosing the portable frame for blocking solids, and piping coupled within the enclosed portable frame for extracting water. The aquatic extraction and filtration device filtering and moving of water at a first flow rate by a pump, and moving the filtered water through a set of openings at a second flow rate, greater than the first flow rate by the pump. Finally, extracting water through the set of openings at a substantially equal flow rate to that of a third flow rate of water that moves through the pump.

5 Claims, 21 Drawing Sheets

U.S. PATENT DOCUMENTS

| | | | | |
|---|---|---|---|---|
| 3,348,686 A | * | 10/1967 | Spitzer | 210/167.16 |
| 3,495,714 A | * | 2/1970 | Barton | 210/460 |
| 3,556,301 A | * | 1/1971 | Smith et al. | 210/242.3 |
| 3,613,894 A | * | 10/1971 | Clegg, Jr. | 210/276 |
| 3,643,802 A | * | 2/1972 | Jackson, Jr. | 210/172.3 |
| 3,722,685 A | | 3/1973 | Orensten et al. | |
| 3,722,686 A | * | 3/1973 | Arnett et al. | 210/170.09 |
| 3,759,330 A | * | 9/1973 | Rainey et al. | 169/47 |
| 3,782,552 A | * | 1/1974 | Wendell | 210/242.1 |
| 3,783,888 A | * | 1/1974 | Johnson | 137/145 |
| 3,799,217 A | * | 3/1974 | Bauer | 141/1 |
| 3,833,124 A | * | 9/1974 | Sugiyama et al. | 210/460 |
| 4,179,379 A | * | 12/1979 | Mitchell | 210/242.1 |
| 4,357,238 A | * | 11/1982 | Ziaylek, Jr. | 210/232 |
| 4,560,476 A | * | 12/1985 | Nishimori | 210/416.1 |
| 4,647,374 A | * | 3/1987 | Ziaylek et al. | 210/242.1 |
| 4,740,317 A | | 4/1988 | Yost | |
| 4,851,118 A | * | 7/1989 | Kurihara | 210/315 |
| 4,874,510 A | * | 10/1989 | Akira et al. | 210/172.4 |
| 4,973,403 A | * | 11/1990 | Kozey | 210/170.09 |
| 5,082,013 A | * | 1/1992 | Scheib | 137/1 |
| 5,160,039 A | | 11/1992 | Colburn | |
| 5,257,643 A | * | 11/1993 | Merrett | 137/236.1 |
| 5,269,338 A | * | 12/1993 | Figas | 137/140 |
| 5,392,806 A | * | 2/1995 | Gallant | 137/236.1 |
| 5,431,816 A | * | 7/1995 | Aldred et al. | 210/460 |
| 5,435,464 A | * | 7/1995 | Alexander et al. | 222/105 |
| 5,496,468 A | * | 3/1996 | Cormier | 210/172.3 |
| 5,509,437 A | * | 4/1996 | Merrett | 137/15.02 |
| 5,584,991 A | | 12/1996 | Wittstock et al. | |
| 5,650,073 A | | 7/1997 | Merret | |
| 5,695,654 A | * | 12/1997 | Schultz | 210/780 |
| 5,797,421 A | * | 8/1998 | Merrett | 137/236.1 |
| 5,851,385 A | * | 12/1998 | Merrett | 210/170.09 |
| 5,922,197 A | * | 7/1999 | Sparks | 210/232 |
| 5,958,234 A | | 9/1999 | Dwyer et al. | |
| 5,993,652 A | | 11/1999 | Stoneburner et al. | |
| 6,036,850 A | * | 3/2000 | Reynolds | 210/117 |
| 6,051,132 A | * | 4/2000 | Flores | 210/167.21 |
| 6,089,790 A | | 7/2000 | Berry, III | |
| 6,279,187 B1 | * | 8/2001 | Herrington et al. | 15/1.7 |
| 6,386,049 B1 | * | 5/2002 | Schrumm | 73/861.66 |
| 6,401,829 B1 | * | 6/2002 | Newton | 169/24 |
| 6,440,303 B2 | * | 8/2002 | Spriegel | 210/232 |
| 6,488,846 B1 | * | 12/2002 | Marangi | 210/232 |
| 6,491,818 B2 | | 12/2002 | Dwyer et al. | |
| 6,524,028 B2 | | 2/2003 | Bryan | |
| 6,638,435 B2 | * | 10/2003 | Loreno | 210/767 |
| 6,682,651 B1 | * | 1/2004 | Toland et al. | 210/155 |
| 6,712,959 B2 | * | 3/2004 | Ekholm et al. | 210/162 |
| 6,764,596 B2 | * | 7/2004 | Tucker | 210/162 |
| 6,949,198 B2 | * | 9/2005 | Reber | 210/747 |
| 6,953,528 B2 | * | 10/2005 | Nesfield | 210/747 |
| 7,201,842 B2 | * | 4/2007 | Kiefer | 210/162 |
| 7,273,545 B1 | * | 9/2007 | Lloyd | 210/162 |
| 2007/0267340 A1 | * | 11/2007 | Bleigh et al. | 210/486 |
| 2008/0061010 A1 | * | 3/2008 | Tom | 210/767 |

* cited by examiner

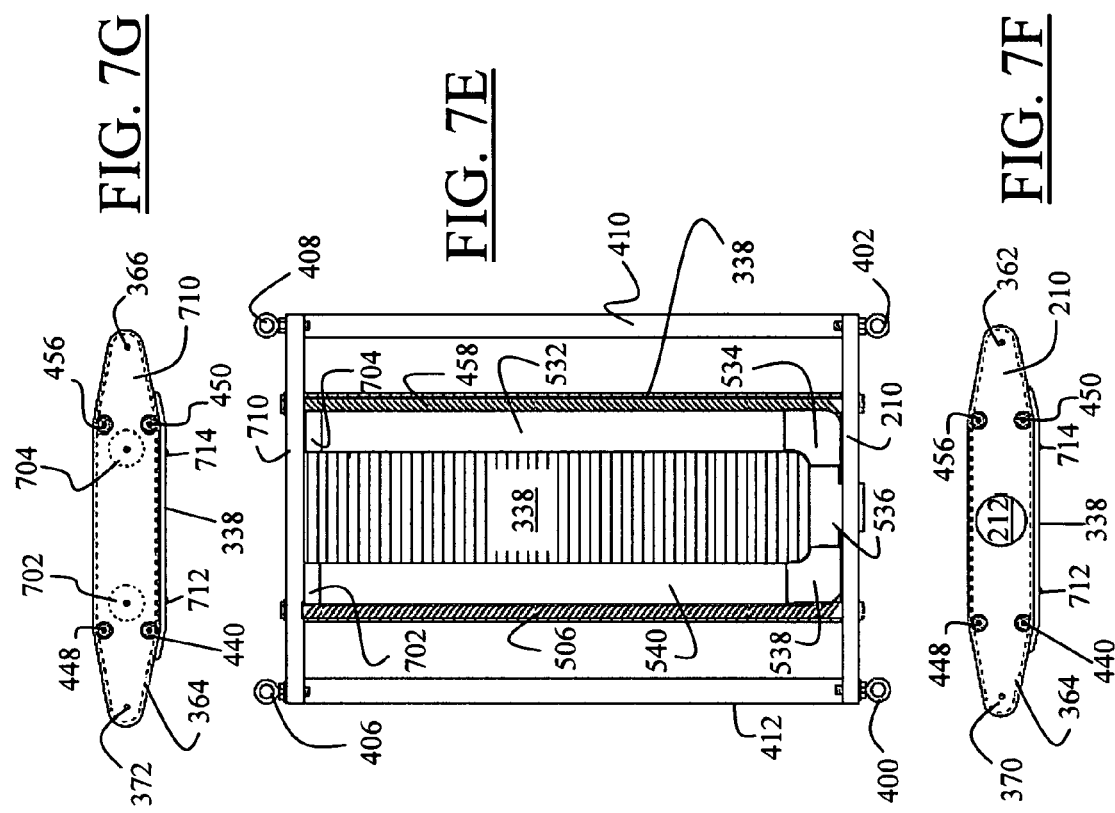

ENVIRONMENTALLY FRIENDLY WATER EXTRACTION DEVICE

CROSS-REFERENCE TO RELATED APPLICATIONS

This Application claims the benefit of priority and of U.S. Utility Provisional Patent Application No. 60/802,639, filed May 23, 2006, the entire disclosure of which application is expressly incorporated by reference in its entirety herein.

BACKGROUND OF THE INVENTION (1) Field of the Invention

This invention relates to aquatic extraction system and, more particularly, to an aquatic extraction system with filtration that is environmentally friendly.

(2) Description of Related Art

Conventional aquatic extraction systems are well known and have been in use for a number of years. Reference is made to the following few exemplary U.S. Patent Publications, including U.S. Pat. Nos. 3,722,685; 4,740,317; 5,160,039; 5,584,991; 5,650,073; 5,958,234; 5,993,652; 6,089,790; 6,491,818; and 6,524,028. Regrettably, most prior art aquatic extraction systems suffer from obvious disadvantages in that they are comprised of permanently fixed structures located on or near a body of water, are bulky, costly to manufacture, and expensive to maintain. Further, because they are permanently fixed, they are disruptive to the environmental ecosystem and are not esthetically pleasing when installed in a natural setting such as near a river or pond.

In addition, most other prior art water pump systems have powerful water intake units that remove or draw out massive amounts of water in a very short time. The pull or suction of water by these pumps generates a high velocity water flow (vortex) near the pump intake unit. The high rate of water flow is sufficiently strong that aquatic lives such as fish cannot escape the water current generated, and are sucked into the pump system. Therefore, regrettably, during water pumping operations, water is not the only element removed, but in addition, fish and other aquatic life is also drawn out indiscriminately by the prior art water pump systems, which threaten the ecosystem of the water source and the aquatic life therein.

Accordingly, in light of the current state of the art and the drawbacks to current aquatic extraction systems mentioned above, a need exists for an apparatus for aquatic extraction and filtration system that would be environmentally friendly. In addition, a need exists for such an apparatus that would be lightweight and portable and that would allow for varying rates of extraction of water for different applications without threatening the ecosystem of the water source and the aquatic life therein.

BRIEF SUMMARY OF THE INVENTION

One aspect of the present invention provides an aquatic extraction and filtration device that is comprised of a portable frame, piping coupled with the portable frame, and a screen enclosing the portable frame and the piping.

An optional aspect of the present invention provides an aquatic extraction and filtration device that further includes a pan coupled with the screen.

Another optional aspect of the present invention provides an aquatic extraction and filtration device wherein the portable frame is comprised of a set of compression supports and a set of lateral structural posts, with the set of compression supports and the set of lateral structural posts forming an axial length of the portable frame, and a set of bulkheads transversely coupled with the set of compression supports and the set of lateral structural, with the bulkheads forming a width of the portable frame.

Yet another optional aspect of the present invention provides an aquatic extraction and filtration device wherein the set of compression supports is comprised of hallow tubes and a commensurate set of first fasteners inserted through the hallow tubes for fastening the set of compression supports with the set of bulkheads.

Still another optional aspect of the present invention provides an aquatic extraction and filtration device wherein the set of first fasteners are comprised of all-thread, and are coupled with the set of bulkheads by nuts.

Another aspect of the present invention provides a method for extraction of water, comprising filtering and moving of water at a first rate by a pump operating at a pump rate; moving the filtered water through a set of openings at a second rate, greater than the first rate by the pump operating at the pump rate; and extracting water through the set of openings at a substantially equal rate to that of the pump rate.

Another optional aspect of the present invention provides a method for extraction of wherein the filtering and moving of water is performed at a distance away from the set of openings.

Another optional aspect of the present invention provides a method for extraction of wherein set of openings is comprised of a first set of openings and a second set of openings.

A further optional aspect of the present invention provides an aquatic extraction and filtration device wherein the set of lateral structural supports are comprised of hallow tubes that are fastened to the set of bulkheads by a set of eyebolts.

Yet a further optional aspect of the present invention provides an aquatic extraction and filtration device wherein the set of bulkheads are comprised of a groove for securing the screen therein, with the groove being proximal along an inside periphery edge of the set of bulkheads allowing transversely oriented edges of the screen along the width of the portable frame to be inserted within the groove of the set of bulkheads.

Another optional aspect of the present invention provides an aquatic extraction and filtration device wherein the piping is comprised of two main pipes that are oriented longitudinally along an axial length of the portable frame, with each pipe including two sets of slots aligned along an axial length of the pipes. A first set of slots of the two sets of slots face an exterior of the portable frame juxtaposed proximal lateral edges of the portable frame and are oriented at an angle $\lambda$ degrees. A second set of slots of the two sets of slots face an interior of portable frame and are oriented at angle $\phi$ degrees. The first set of slots and the second set of slots are comprised of different sizes, with larger size slots placed away from a suction end coupled with a pumping unit for equalizing a suction velocity across an entire area of the screen, eliminating high flow areas that might impinge aquatic life.

Another aspect of the present invention provides a method for extraction of water, comprising filtering and moving of water at a first flow rate by a pump, then moving the filtered water through a set of openings at a second flow rate, greater than the first flow rate by the pump, and finally extracting water through the set of openings at a substantially equal flow rate to that of a third flow rate of water that moves through the pump.

Another optional aspect of the present invention provides a method for extraction of water wherein the filtering and moving of water is performed at a distance away from the set of openings.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding part(s) throughout:

FIG. 7E is an exemplary top view illustration of the aquatic extraction and filtration device for a second plumbing option in accordance with the present invention;

FIG. 7F is an exemplary top view illustration of the first bulkhead in accordance with the present invention;

FIG. 7G is an exemplary top view illustration of the second bulkhead used with the second embodiment illustrated in FIG. 7E in accordance with the present invention;

FIG. 7H is an exemplary perspective illustration of a set of plugs used with the second embodiment illustrated in FIGS. 7E and 7G.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Various jurisdictional regulations have been instituted that require the preservation of marine life, regardless of the reason for which water is extracted from various water sources such as lakes, ponds, rivers or others. The present invention provides an environmentally friendly aquatic extraction and filtration device that is portable, lightweight, has low profile, and provides effective, economic means of protecting aquatic life and, further, provides protection for the equipment used for water extraction. The present invention reduces the "approach" velocity of the water proximal a protective screen of the aquatic extraction and filtration device of the present invention, enabling aquatic life such as fish to swim away from the device. The approach velocity of water is the velocity (speed and direction) that water flows through the protective screen of the present invention. That is, it is the momentum (mass and velocity) of the water current being impinged upon the screen. The present invention therefore, prevents aquatic life from being impaled or impinged on the protective screen of the present invention, and from being ingested into the pump stream. Further, although the "approach" velocity of the water proximal the protective screen is reduced to a level that protects aquatic life, the present invention maintains the rate of water pumped and in fact, the rate of water extracted is easily controlled by variation in the dimensions of the device of the present invention. Therefore, in order to maintain a low level of approach velocity of water, if the pumping rate of the water is increased, then the size of the screen is commensurately increased. This way, a large volume of water flows over a larger surface area, neutralizing, maintaining, or in fact, reducing the actual approach velocity of the water near the protective screen, despite an increase in the rate of water pumped.

Figure 1A:
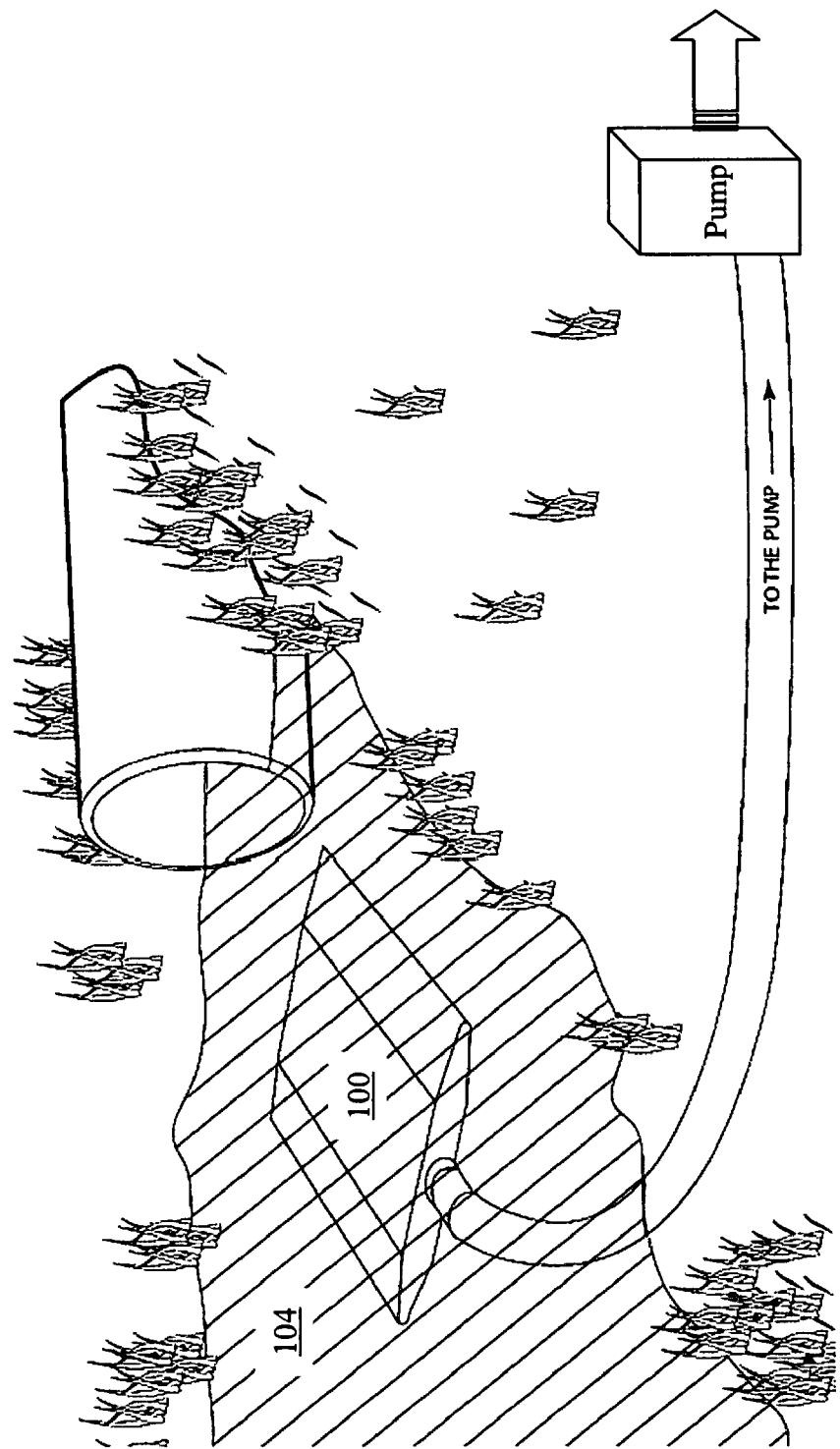
FIGS. 1A and 1B are an exemplary overview illustration of environments within which the aquatic extraction and filtration device of the present invention may be used in accordance with the present invention.
Figure 1B:
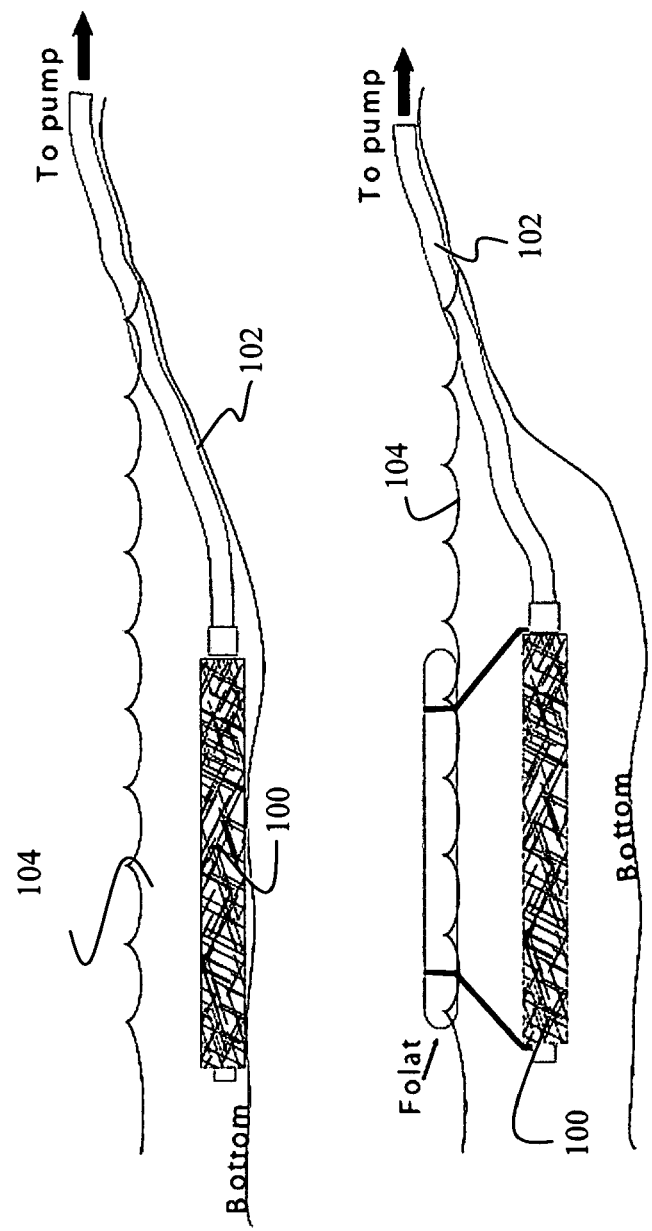

FIGS. 1A and 1B are an exemplary overview illustration of typical environments within which the aquatic extraction and filtration device 100 of the present invention is mostly used, which are ponds, rivers, and other natural bodies of water. The aquatic extraction and filtration device 100 of the present invention may be coupled with a water pump system 102 to extract water 104 from a body of water, which may eventual be used to fight fire, such as in wild land firefighting situations. The present invention can be immersed and placed at the bottom floor of the body of water, or be floated by a buoyant or a floatation device. Although not illustrated, for deep waters, the aquatic extraction and filtration device 100 of the present invention may also be simply immersed within water at any orientation.

The aquatic extraction and filtration device 100 of the present invention may be described in terms of three main sections, which include a screen, a framework, and internal plumbing. The screen assembly includes the screen and connection units, is the filtering part of the device, and further forms an enclosure for the device. The portable frame of the aquatic extraction and filtration device 100 of the present invention functions to give the device its low profile, and allows the screen to wrap around the portable frame giving the screen additional surface area for the given screen size. The low profile of the portable frame allows drafting in shallow water situations, and decreases the overall weight of the aquatic extraction and filtration device 100. The portable frame further includes a pair of bulkheads, which form the shape of the screen and block the water flow of the stream, eliminating unwanted excessive "approach velocities" that might impinge aquatic life or debris to the screen surface. Exemplary eyebolts attach the bulkheads and the outer portable frame tubes, and provide an attachment point for securing or suspending the device in the water source. A carry sling (not shown) may be attached to the eyebolts. The screen enclosure and the portable frame form a housing for the internal plumbing, which is comprised of main pipes having slots, through which water is pumped, and includes optional periphery plumbing such as "T" and elbow configuration pipes for connection of the main pipes to the pump. The main pipes of the internal plumbing are slotted, with slot sizes increasing as they progress along the length of the pipes (away from the pump) and are aligned at certain angles. This configuration distributes the suction flow of water evenly across the entire screen surface.

Figure 2:
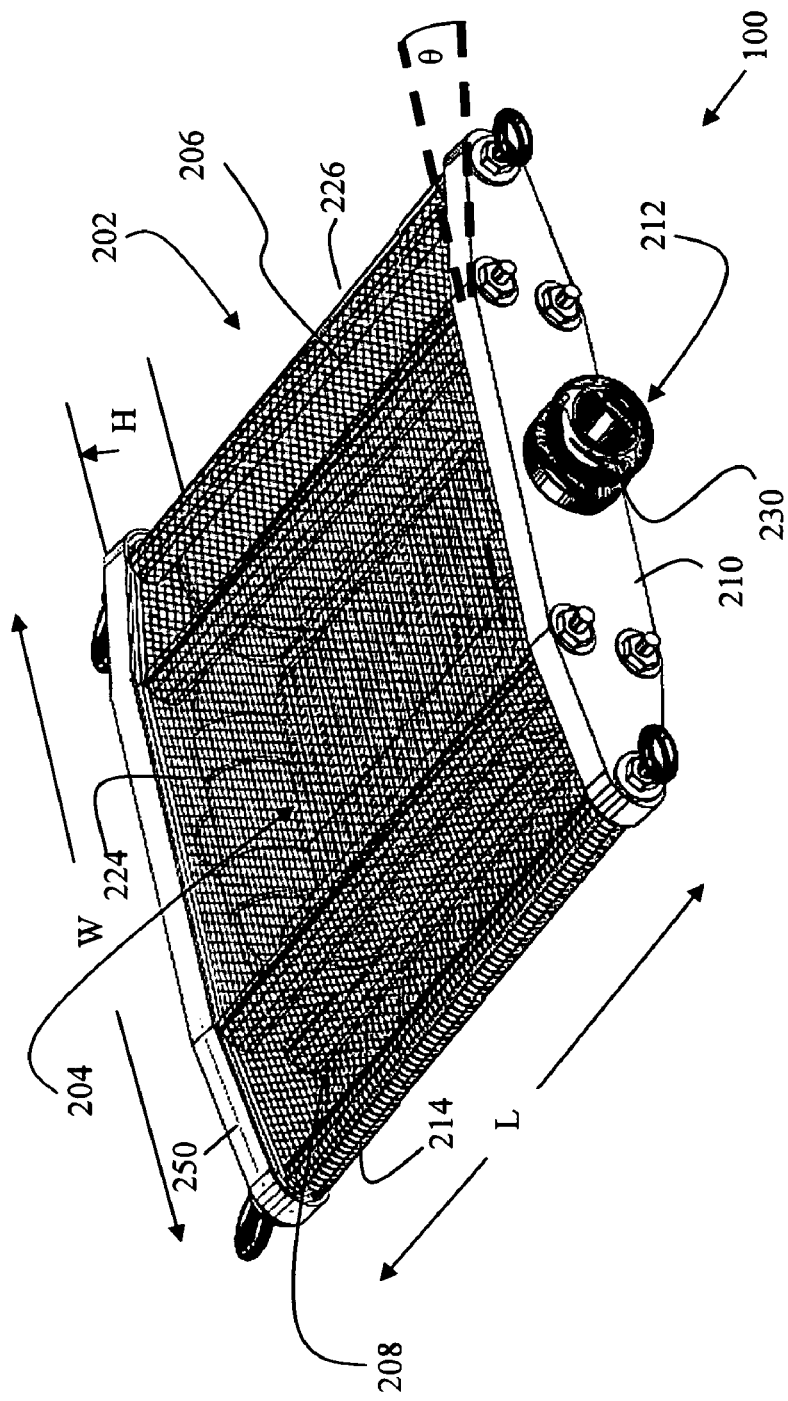
FIG. 2 is an exemplary perspective illustration of an aquatic extraction and filtration device in accordance with the present invention.
Figure 3A:
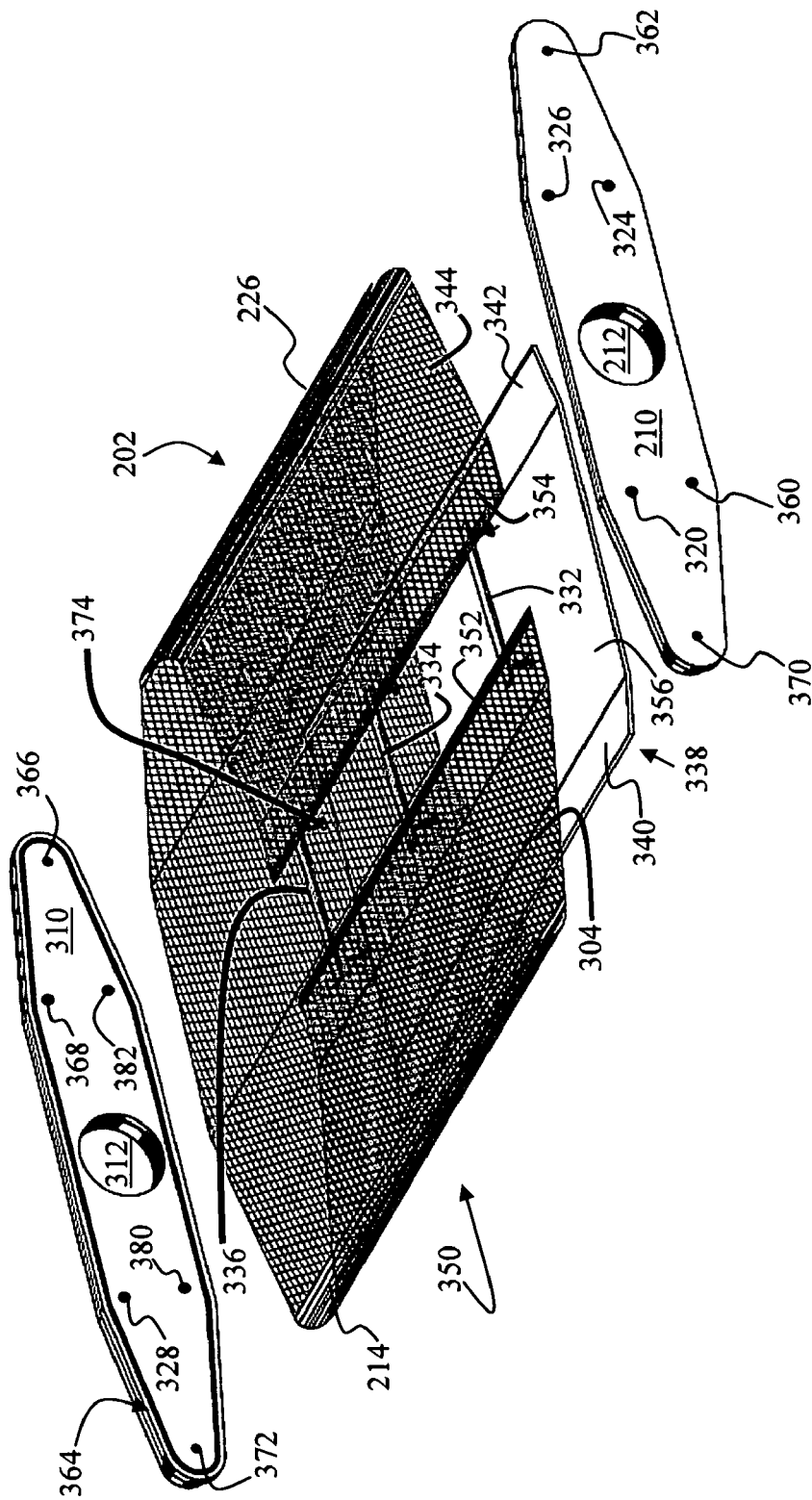
FIG. 3A is an exemplary perspective illustration of the aquatic extraction and filtration device 100 illustrated in FIG. 2, showing a disassemble view of the screen in accordance with the present invention.

FIG. 2 is an exemplary perspective illustration of an aquatic extraction and filtration device 100 in accordance with the present invention, and FIG. 3A is an exemplary perspective illustration of the aquatic extraction and filtration device 100 illustrated in FIG. 2, showing a disassemble view of the screen 202. As illustrated in both FIGS. 2 and 3A, the aquatic extraction and filtration device 100 is comprised of a single piece, unitary screen 202 that wraps around a portable frame, and functions as a filter. The screen 202 of the aquatic extraction and filtration device 100 is longitudinally configured into a structure having a plurality of straight or flat sides and two curved or rounded lateral edges, spanning longitudinally along an axial length L of the aquatic extraction and filtration device 100.

The top section 204 of the screen 202 includes the middle portion 224, and the bottom section 350 (FIG. 3A) includes a corresponding middle portion that is comprised of the two end sections 352 and 354 of the screen. When assembled, the middle portion 224 is parallel to the coupled end sections 352 and 354, parallel along the axial length L of aquatic extraction and filtration device 100. The top section 204 further includes two top lateral portions 206 and 208 that are bent at an angle θ relative to the surface of the middle portion 224, and have an axial length L. The screen 202 further includes the curved or rounded lateral edges 214 and 226, which are common to both top and bottom sections 204 and 350, and which curve or bend to form the two bottom lateral portions 304 and 344 of the screen. The two bottom lateral portions 304 and 344 are bent at an angle θ, relative to the surface of the screen ends 352 and 354 that are substantially horizontally oriented. As further illustrated in FIG. 3A, couplers 332, 334, and 336 in the form of slats couple the screen ends 352 and 354 with one another to shape the bottom middle portion, which is parallel with the top middle portion 224. The slat couplers 332, 334, and 336 may be coupled with the screen ends 352 and 354 by a variety of mechanisms, a non-limiting example of which may be the use of screws 374.

As illustrated in FIG. 3A, the screen 202 is capped by a front side 210 and a backside 310 that are parallel in relation to one another, and are transversely coupled with the longitudinally oriented sides of the screen 202 to form the width of the aquatic extraction and filtration device 100. The front side 210 and the backside 310 (collectively known as bulkheads) form a part of the portable frame, and enclose the screen 202 at axial ends. The screen 202 is detachably fixed on to the bulkheads 210 and 310. The detachably removable bulkheads 210 and 310 provide easy access to within the enclosure (formed by the screen 202) for replacement of the inside components of the aquatic extraction and filtration device 100. It should be noted that although bulkheads are referred to as either "front side 210" and the "backside 310," both bulkheads are identical, and can function as the front or back sides. Of course, regardless of the nomenclature, the water flow through the device 100 is only in one direction. That is, the aquatic extraction and filtration device 100 can only be coupled between the water source and the pump in only one way due to its internal plumbing configuration. Stated otherwise, the actual bulkheads may be interchangeable, but the direction in which the actual aquatic extraction and filtration device 100 of the present invention is coupled between the water source and the pump is specifically in only one orientation, which is dictated by the internal plumbing configuration.

Figure 3B:
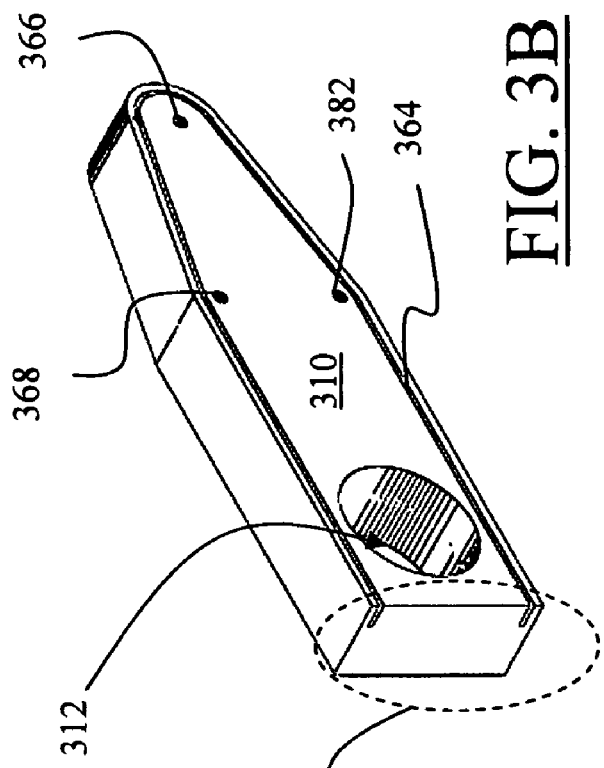
FIG. 3B is an exemplary perspective illustration of one of the bulkheads in accordance with the present invention.
Figure 3C:
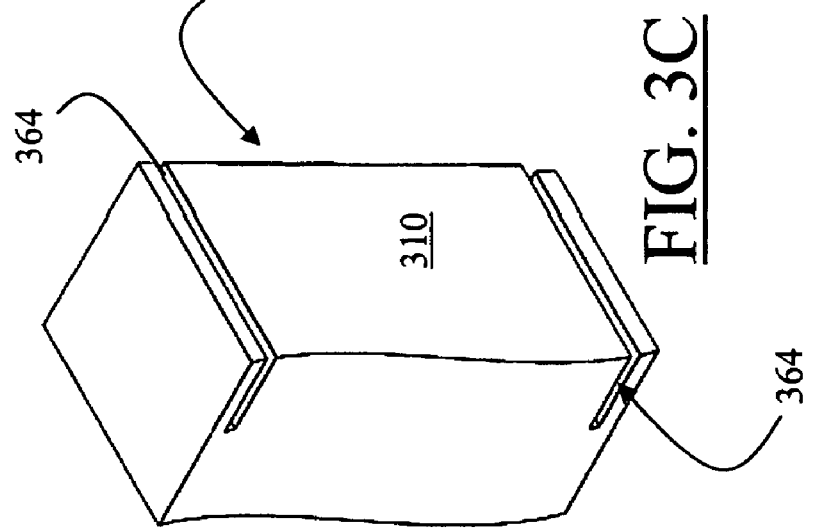
FIG. 3C is an exemplary enlarged perspective illustration of a section of the bulkhead illustrated in FIG. 3B in accordance with the present invention.
Figure 3D:
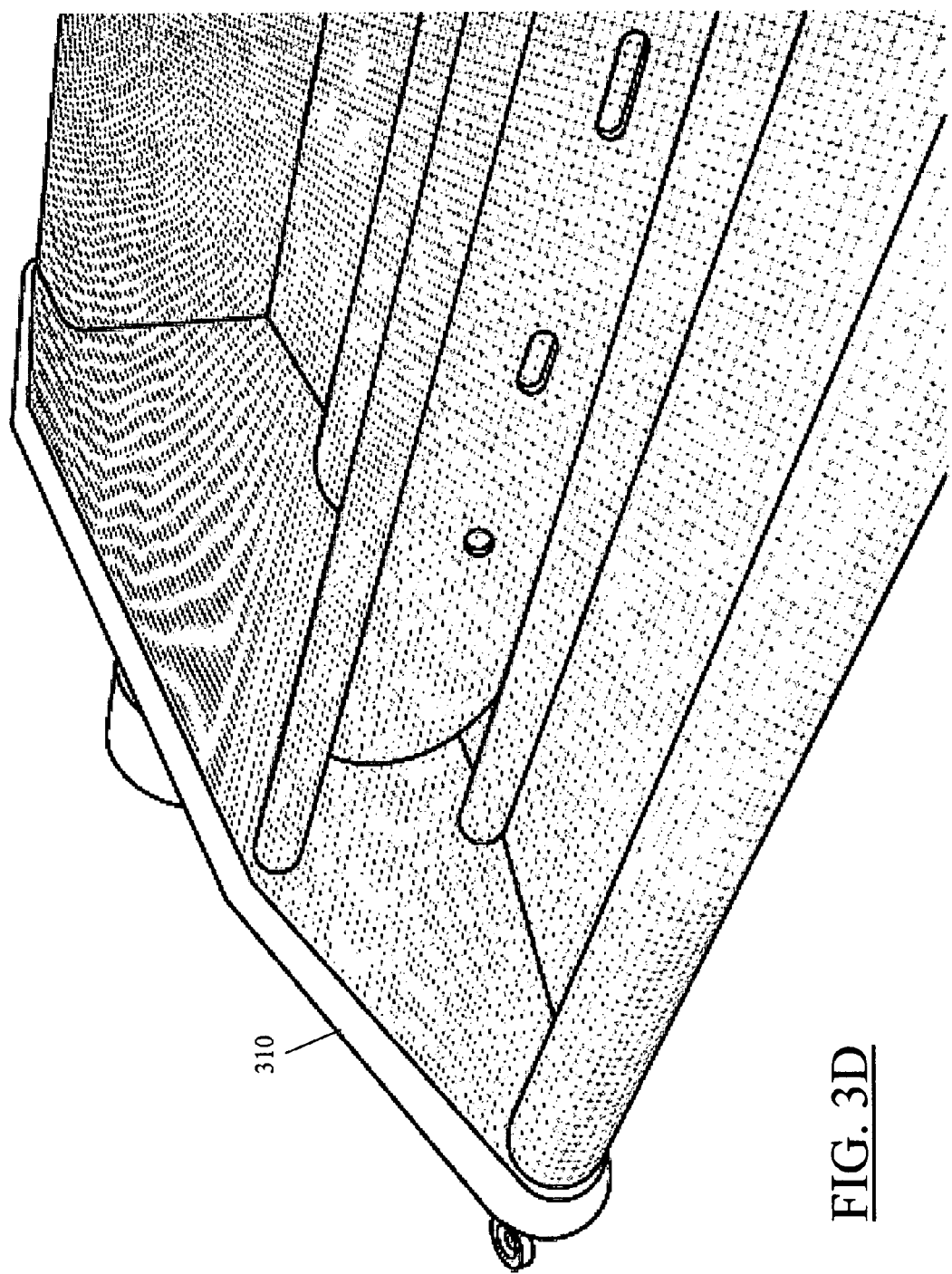
FIG. 3D is an exemplary perspective close-up view of the assembled screen with one of one of the bulkheads in accordance with the present invention.

FIG. 3B is an exemplary perspective illustration of one of the bulkheads, showing the details of the grooves for securing the screen 202 therein, FIG. 3C is an exemplary enlarged perspective illustration of a section of the bulkhead illustrated in FIG. 3B, and FIG. 3D is an exemplary perspective close-up view of the assembled screen with one of one of the bulkheads. As best illustrated in FIGS. 3B and 3C, the bulkheads 210 and 310 further includes a groove 364 proximal along an inside periphery edge of the bulkheads 210 and 310 having an approximate width of about ¼ inch and an approximate depth of ⅜ inch. The groove 364 of the bulkheads 210 and 310 is used to help secure the screen 202 to the respective bulkheads 210 and 310, and maintain and secure the structural integrity of the screen 202. In other words, the transversely oriented edges of the screen along the width W of the device 100 are inserted within the groove 364 of the bulkheads 210 and 310, and secured therein as illustrated in FIGS. 2 and 3D. Reference 250 exemplarily illustrates the hidden portion of the one screen edge within the groove 364 of the bulkhead 310.

It should be noted that transversely oriented edges of the screen 202 along the width W of the device 100 are first inserted within the groove 364 of the bulkheads 210 and 310, and then the slats 332, 334, and 336 are used to couple the screen ends 352 and 354. That is, after the portable frame is first made, the inner plumbing is made second, and the bulkheads are coupled with the portable frame, next, the screen 202 is assembled in accordance with the above description. The screen 202 is wrapped first, tightened, and then slats 332, 334, and 336 are used to coupled the screen ends 352 and 354. Finally, a sealant is used around the bulkhead grooves 364. At the end, an optional pan 338 is placed and affixed to the exterior of the screen enclosure 202.

As stated, further included with the aquatic extraction and filtration system 100 is an optional pan 338, which is substantially configured commensurate with the longitudinal axial sides of the screen 202. That is, it includes a middle portion 356 and two lateral ends 340 and 342, with the lateral ends 340 and 342 bent at an angle to substantially match the bent angle of two bottom lateral portions 304 and 344 of the screen 202. The optional pan 338 is coupled to the exterior of the screen 202, and functions to prevent debris being sucked into the screen, i.e., granulated (fine) sands, rocks, or other debris. In other words, the pan 338 acts as a shield between the screen 202 and the water floor, preventing debris from being introduced into the pump system, which reduces the deterioration of the pumps. In general, the amount of surface area covered by the pan 338 is compensated by an increase in the surface area of the screen 202 that is exposed. Hence, the screen area required to maintain a maximum "approach velocity" for water and to move or pump through a desired amount of water is determined based on the exposed portion of the screen 202. Of course, without the pan 338 the surface area of the screen 202 will be exposed more and therefore, the overall size of the device 100 can be reduced. The pan 338 on the bottom allows the aquatic extraction and filtration device 100 to be placed anywhere in the water basin without hampering its operation. It should be noted that without the use of the pan, the location of the various slot orientations on the internal pipes (described below) would change for efficient operation of the aquatic extraction and filtration device 100.

Figure 4:
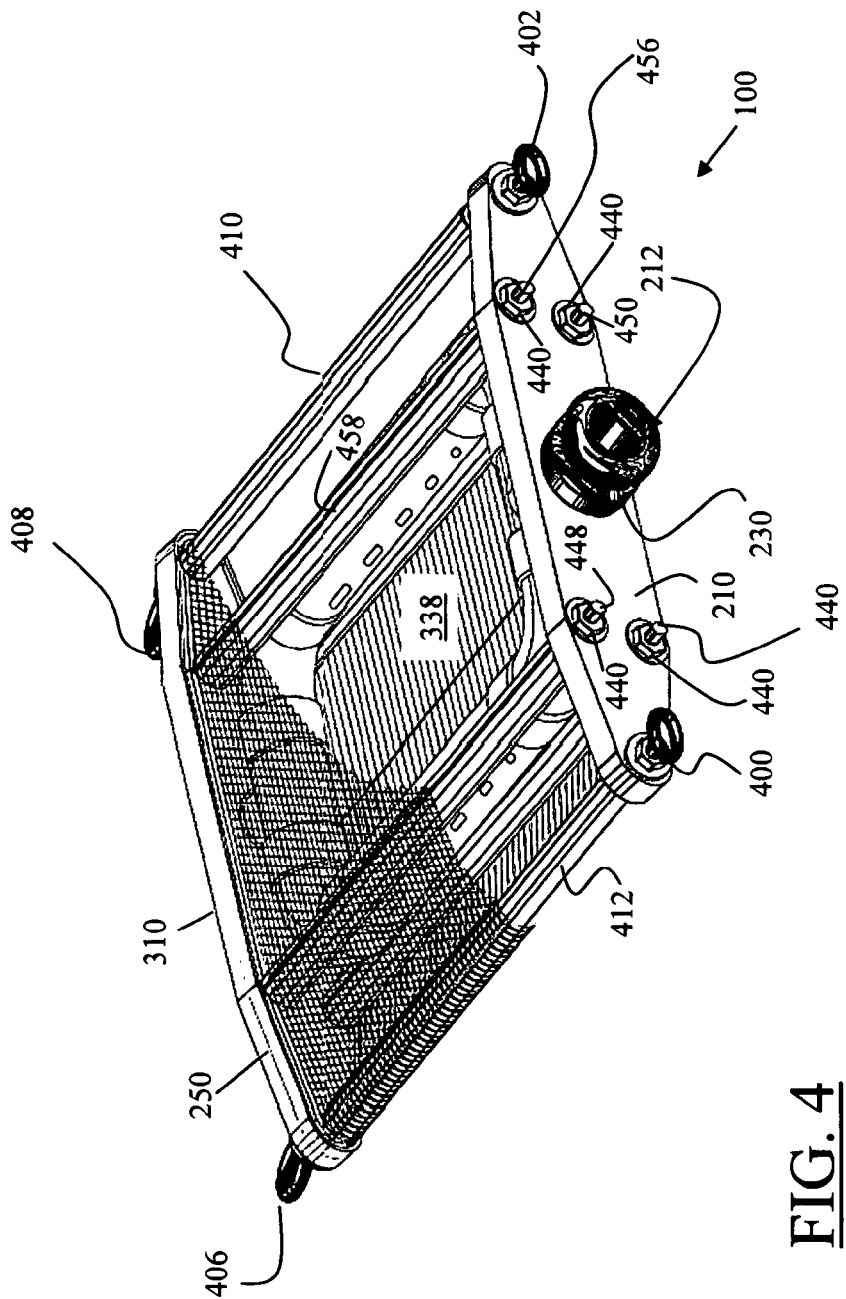
FIG. 4 is an exemplary perspective illustration of the aquatic extraction and filtration device with the screen partially removed, in accordance with the present invention.
Figure 5:
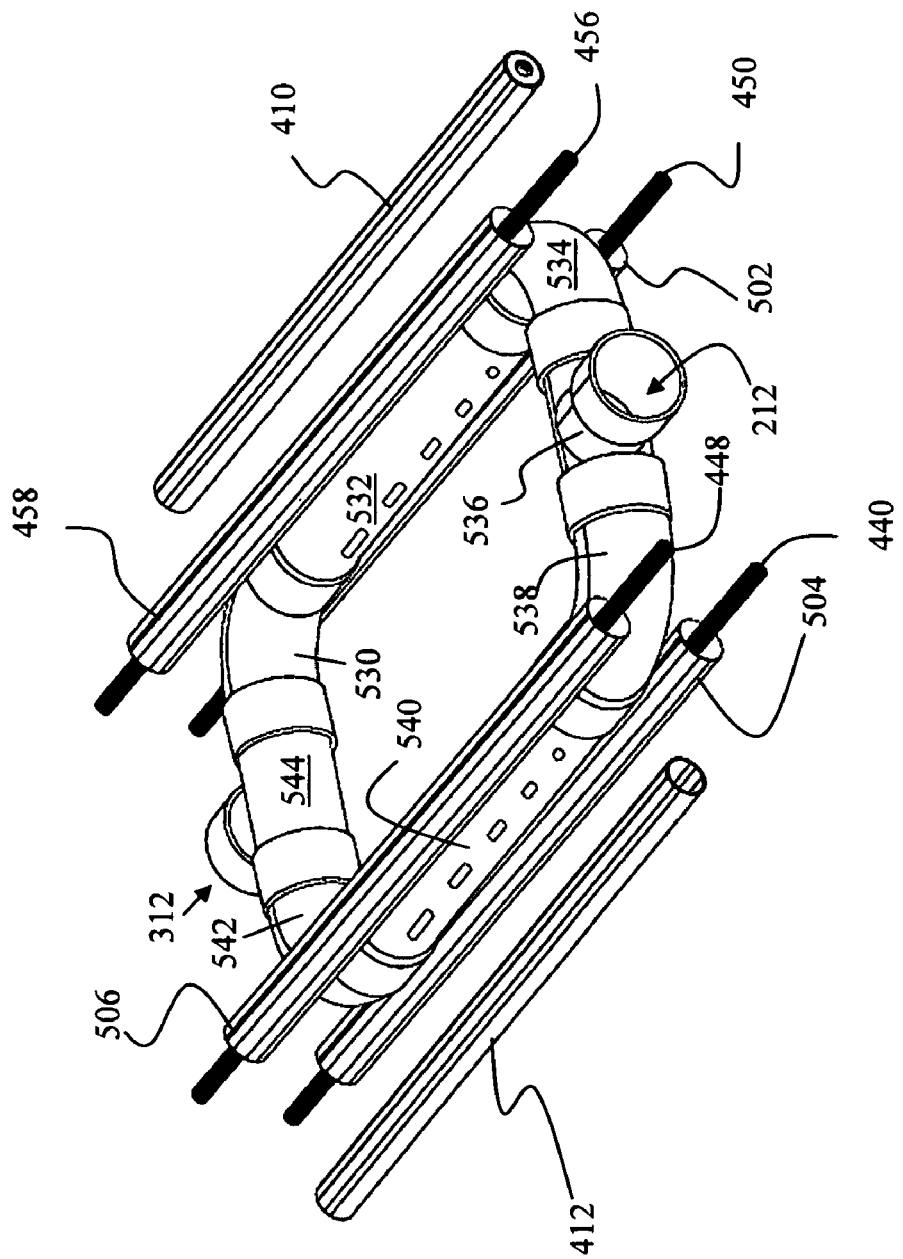
FIG. 5 is an exemplary perspective illustration of the aquatic extraction and filtration device with the bulkheads, screen and the pan removed only showing the internal portable frame and plumbing in accordance with the present invention.
Figure 6:
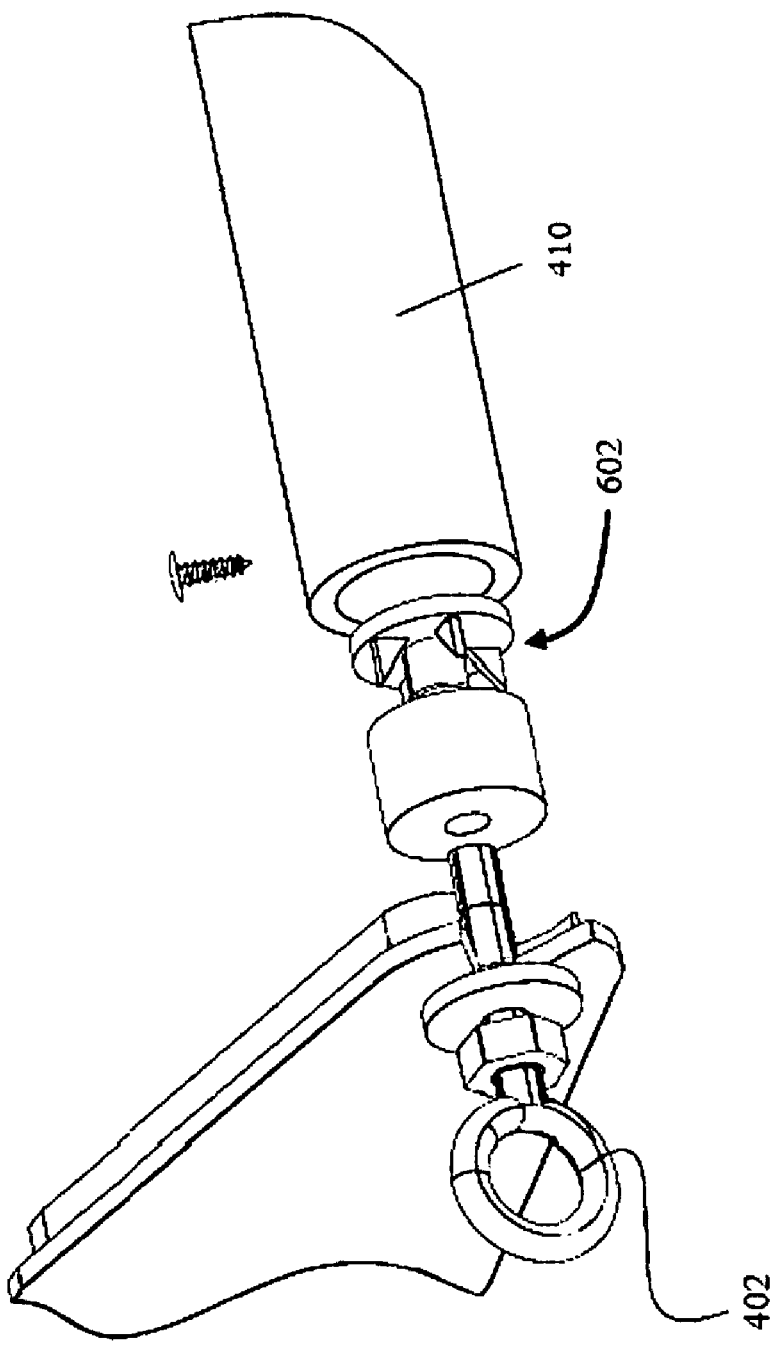
FIG. 6 is an exemplary perspective illustration of an eye-bolt used for coupling the bulkheads in accordance with the present invention.

FIGS. 4 to 6 are exemplary illustrations of the aquatic extraction and filtration device 100, showing its frame and internal plumbing. FIG. 4 is an exemplary perspective illustration of the aquatic extraction and filtration device 100 with the screen 202 partially removed, FIG. 5 is an exemplary perspective illustration of the aquatic extraction and filtration device 100 with the bulkheads, screen and the pan removed only showing the internal frame and plumbing, and FIG. 6 is an exemplary perspective illustration of an eyebolt. As illustrated in the FIGS. 4 to 6, the portable frame of the aquatic extraction and filtration device 100 is generally comprised of two or more hallow, lateral structural posts 410 and 412 that coupled the bulkheads 210 and 310 and define the axial length (longitudinally) of the aquatic extraction and filtration device 100. The lateral structural posts also facilitate in forming the shape of the screen 202, in particular, the curved or rounded lateral edges 214 and 216 thereof, and prevent the screen enclosure 202 from collapsing longitudinally. Non-limiting examples of materials for the structural posts may include a 60/61 T6 Aluminum, where (60/61 is the alloy composition, and T6 is the brittleness of the Aluminum). In other words, the two or more structural posts 410 and 412 must be strong, and cannot flex. Of course, any material that is not flexible, is ridged, strong, and can resist corrosion may be used, a non-limiting example of which may include high-density polyethylene. The axial lengths of the structural posts depend on the size of the aquatic extraction and filtration device 100.

As best illustrated in FIGS. 4 and 5, further included as part of the overall portable frame of the aquatic extraction and filtration device 100 are substantially centrally located hallow compression supports 458, 502, 504, and 506 that include within their longitudinally oriented hallow chambers a respective set of all-threads 456, 450, 440, and 448. As with the lateral structural posts 410 and 412, the compression supports 458, 502, 504, and 506 couple and tighten the bulkheads 210 and 310 together and define the axial length (longitudinally) of the aquatic extraction and filtration device 100. The compression supports 458, 502, 504, and 506 also facilitate in forming the shape of the screen 202, in particular, the middle portion 224, lateral portions 206 and 208, bottom lateral portions 304 and 344, screen ends 352 and 354 thereof, and prevent the screen 202 from collapsing longitudinally. Accordingly, the lateral posts 410 and 412 pull the screen 202 laterally and the compression supports 458, 502, 504, and 506 maintain the screen 202 up and above the internal pipes so that the screen 202 does not rest on the pipes, in particular, preventing the screen enclosure from blocking the various apertures aligned along the internal pipes. This also improves the flow of water within the space created between the compression supports 458, 502, 504, and 506 and the internal pipes. Non-limiting examples of materials for the compression supports 458, 502, 504, and 506 may include a 60/61 T6 Aluminum, where (60/61 is the alloy composition, and T6 is the brittleness of the Aluminum). In other words, the compression supports 458, 502, 504, and 506 must be strong, and cannot flex. Of course, any material that is not flexible, is ridged, strong, and can resist corrosion may be used, a non-limiting example of which may include high-density polyethylene. The axial lengths of the compression supports 458, 502, 504, and 506 depend on the size of the aquatic extraction and filtration device 100.

As further illustrated in FIG. 4, the portable frame of the aquatic extraction and filtration device 100 is further comprised of the bulkheads 210 and 310, which define the transverse shape of the portable frame. The bulkheads 210 and 310 function to cap the screen 202 at its transversely oriented sides, and are detachably coupled with one another by the posts 410 and 412 and the compression supports 458, 502, 504, and 506. The posts 410 and 412 are coupled to the bulkheads through a first set of respective apertures 362 and 366, and 370 and 372 by a first set of fasteners. The compression supports 458, 502, 504, and 506 are coupled to the bulkheads through a second set of respective apertures 360 and 380, 320 and 328, 324 and 382, 326 and 368 by a second set of fasteners. Non-limiting examples of first set of fasteners may include a set of eyebolts 400, 402, 406, 408, and that of second set of fasteners nuts 440 that couple through the respective all-threads 456, 450, 440, and 448 of the respective compression supports 458, 502, 504, and 506. The bulkhead 310 is a mirror image of the bulkhead 210.

The eyebolts attach the bulkheads 210 and 310 with the posts 410 and 412, and provide an attachment point for securing or suspending the device 100 in water. They are also accommodating for carrying an optional sling to be attached thereto. The eyebolts 400, 402, 406, and 408 may be used to suspend the aquatic extraction and filtration device 100 from a floating platform so it can be poised within the body of water. In addition, the eyebolts 400, 402, 406, and 408 enable the securing of the aquatic filtration device 100 in a fast flowing stream of water. The eyebolts provide attachment points on which to secure the screen in position in the water current, suspend it, or relocate it in the water source, without disconnecting it or entering the water to make a positioning adjustment. As best illustrated in FIG. 6, the eyebolts include a washer 602, which facilitates further tightening of the bulkheads together.

Figure 7D:
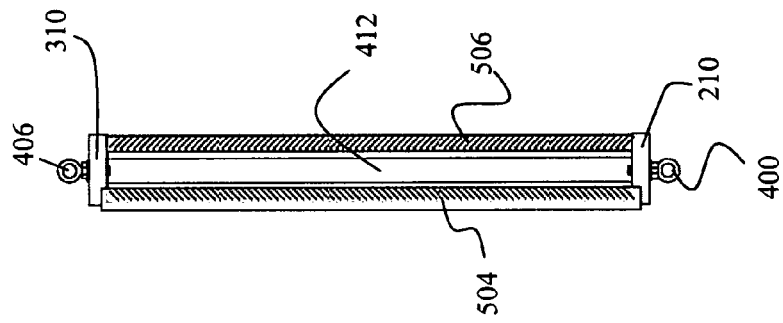
FIG. 7D is an exemplary side view illustration of the aquatic extraction and filtration device in accordance with the present invention.
Figure 7C:
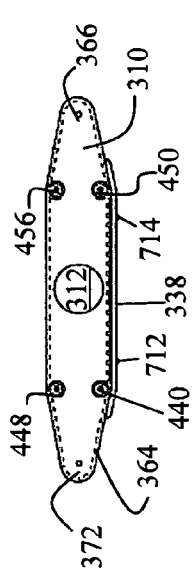
FIG. 7C is an exemplary top view illustration of the second bulkhead in accordance with the present invention.
Figure 7A:
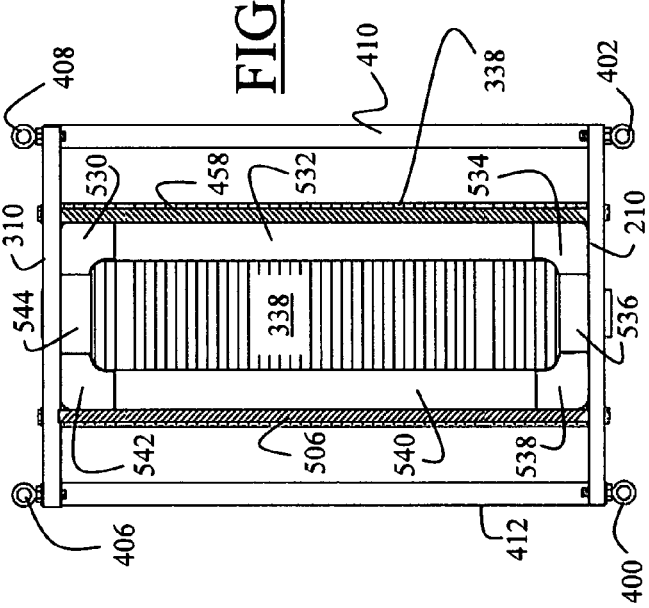
FIG. 7A is an exemplary top view illustration of the aquatic extraction and filtration device in accordance with the present invention.
Figure 7B:
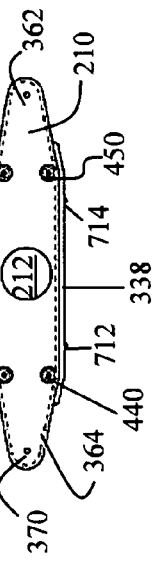
FIG. 7B is an exemplary top view illustration of the first bulkhead in accordance with the present invention.

FIGS. 5 and 7A to 7G detail the various embodiments of the plumbing options of the aquatic extraction and filtration device 100. FIG. 7A is an exemplary top view illustration of the aquatic extraction and filtration device 100, FIG. 7B is an exemplary top view illustration of the first bulkhead (210), FIG. 7C is an exemplary top view illustration of the second bulkhead (310), and FIG. 7D is an exemplary side view illustration of the aquatic extraction and filtration device 100. The bulkheads 210 and 310 have respective central opening 212 and 312 to accommodate for the respective "T" plumbing 536 and 544, with one of the "T" pluming (either 536 or 544) coupled to a cam lock 230 (FIG. 2). As further illustrated in FIGS. 5 and 7A, the aquatic extraction and filtration device 100 is comprised of two main pipes 532 and 540, four pipes of elbow configuration 530, 534, 538, and 542, and two pipes of "T" configuration 536 and 544, all of which are housed within the screen 202. The two main pipes 532 and 540 are adjoined at the openings 212 and 312 of the respective bulkheads 210 and 310 by the "T" and elbow configuration pipes. That is, a first end of the main pipes 532 and 540 are coupled with two elbow configuration pipes 534 and 538, these, in turn, are coupled with one another with a "T" form pipe 536. The second end of the main pipes 532 and 540 are coupled with two other elbow configuration pipes 530 and 542, these, in turn, are coupled with one another with a "T" form pipe 544. The two main pipes 532 and 540 include one or more apertures or slots of different sizes thereon for suction of water (described in detail below). The pan 338 is coupled to the aquatic extraction and filtration device 100 via an exemplary set of fasteners 712 and 714, illustrated in FIGS. 7B and 7C.

FIGS. 7E to 7H are exemplary illustrations of another embodiment of the aquatic extraction and filtration device 100 that use a different plumbing option. This embodiment of the aquatic extraction and filtration device 100 includes similar corresponding or equivalent components as those shown in the previous FIGS. 1A to 7D, and described above. Therefore, for the sake of brevity, clarity, convenience, and to avoid duplication, the general description of FIGS. 7E to 7H will not repeat every corresponding or equivalent component that has already been described above in relation to the aquatic extraction and filtration device 100 that is shown in FIGS. 1A to 7D.

FIG. 7E is an exemplary top view illustration of the aquatic extraction and filtration device 100 for the second plumbing option, FIG. 7F is an exemplary top view illustration of the first bulkhead (210), FIG. 7G is an exemplary top view illustration of the second bulkhead (710), and FIG. 7H is an exemplary perspective illustration of the plugs used with the second embodiment illustrated in FIGS. 7E and 7G. As illustrated, the aquatic extraction and filtration system of 100 includes only the single "T" configuration pipe 536 at a first end. At the other end of the aquatic extraction and filtration system of 100, the "T" configured pipe 544, and the elbow-configured pipes 542 and 530 (all illustrated in FIG. 7A) are removed. Of course, given that the bulkheads 210 and 310 are identical, the "T" configured pipe 544, and the elbow-configured pipes 542 and 530 could remain and, instead, the "T" configured pipe 536, and the elbow-configured pipes 538 and 534 removed. With this embodiment, the bulkhead 310 is replaced with bulkhead 710, which includes plugs 702 and 704 (FIGS. 7G and 7H) that are directly inserted into the open ends of the main pipes 532 and 540 when the bulkhead 710 is coupled with the aquatic extraction and filtration device of 100, as illustrated in FIG. 7E. The plugs 702 and 704 are comprised of thick cylinder that are fastened to the bulkhead 710 by fasteners. The diameter of the plugs 702 and 704 is smaller than the interior diameter of the pipes 532 and 540 to allow the plugs 702 and 704 to be inserted therein. The main pipes 540 and 532 mount onto the respective plugs 702 and 704, which secure the position of the pipes 540 and 532. The plugs 702 and 704 are secured (pulled in) further inside the pipes 540 and 532 when the compression supports 458, 502, 504, and 506 are tightened by the second set of fasteners. It should be noted that bulkhead 710 also differs from that of bulkhead 310 by removing (closure of) the aperture 312.

Figure 8:
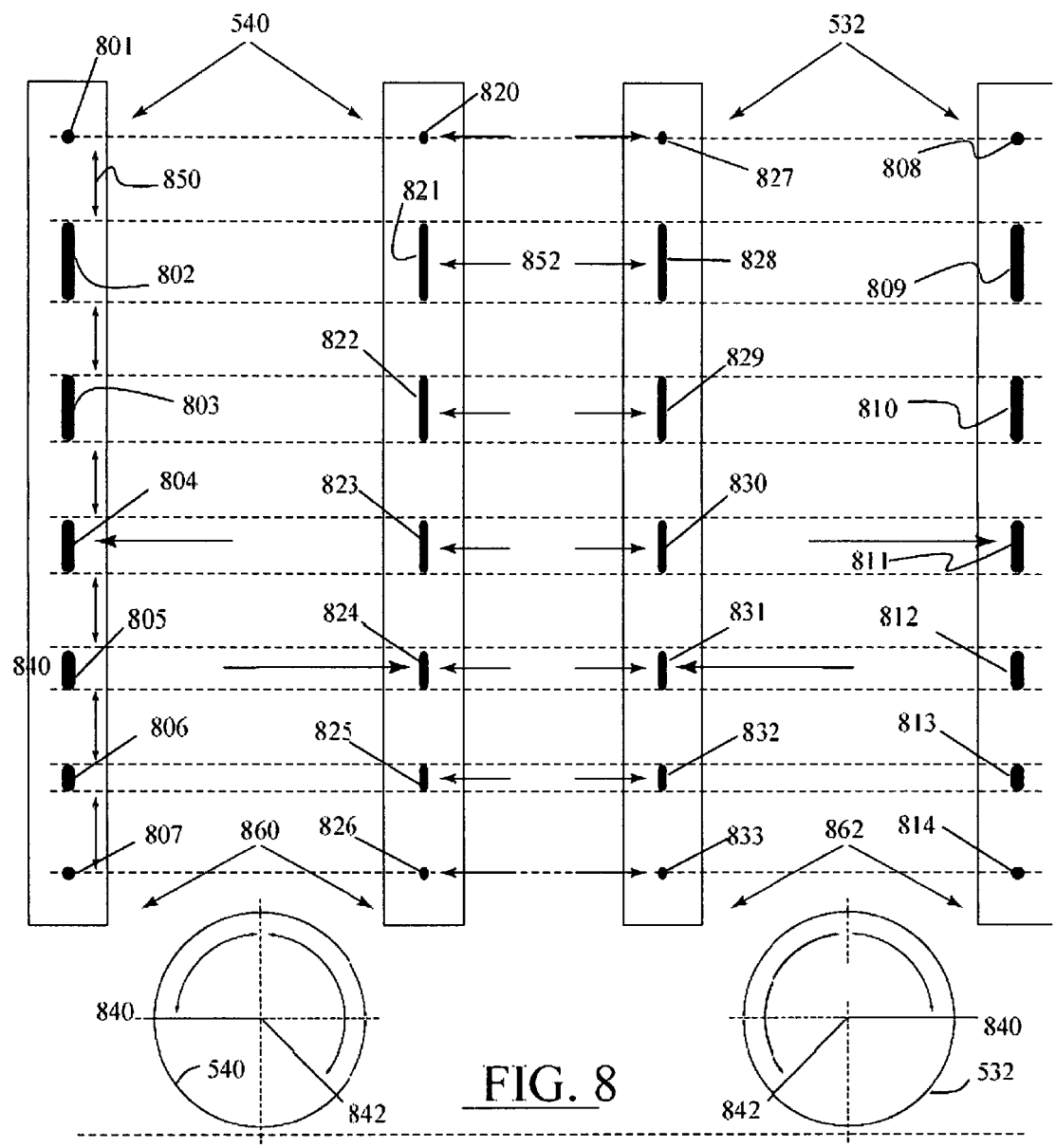
FIG. 8 is an exemplary illustration that maps the various preferred orientations, distances, and sizes of the slots or apertures that are on the preferred two-pipe system of the aquatic extraction and filtration device in accordance with the present invention.

FIG. 8 is an exemplary illustration that maps the various preferred orientations and sizes of the slots or apertures that are on the preferred two pipe system (two main straight pipes 540 and 532). As illustrated in FIG. 8, each of the pipes 540 and 532 has two sets of slots. The slots 801 to 814 facing the exterior of the screen enclosure 202 juxtaposed proximal the curved or rounded lateral edges 214 and 216 are at $\lambda$ degrees orientation as illustrate by the reference number 840, and the slots 820 to 833 facing the interior of the screen enclosure 202 are oriented at $\phi$ degrees as illustrated by the reference number 842. The varying sizes of the slots help equalize the suction velocity across the entire area of the screen, eliminating high flow areas that might impinge aquatic life or debris. The interior slots 820 to 833 are oriented at $\phi$ degrees, which provide a balance of flow. For the embodiment of the aquatic extraction and filtration device 100 that uses the optional pan 338, the interior slots 820 to 830 are lowered towards the ground (the pan) for better disbursement of water, and a more constant flow rate, eliminating hot spots (which are specific locations on the screen where high speed flow rates of water current takes place). The size and slot orientations assures that no hot spots or dead spots (where there is no flow rate of current) are created any where on the screen, and that all flow rates of water 852 impaled or impinged onto the screen is uniform and equal, and is below some jurisdictional standard. The distance 850 between the apertures, and the apertures and the screen is important. Appropriate distances 850 between the apertures allows for even distribution of water flow across the device 100. In addition, the further away the screen is placed from the apertures the more disbursed the flow of the water. Furthermore, larger apertures are placed away from the suction ends 860 and 862 (where the pump is coupled) to reduce vortex.

Figure 9A:
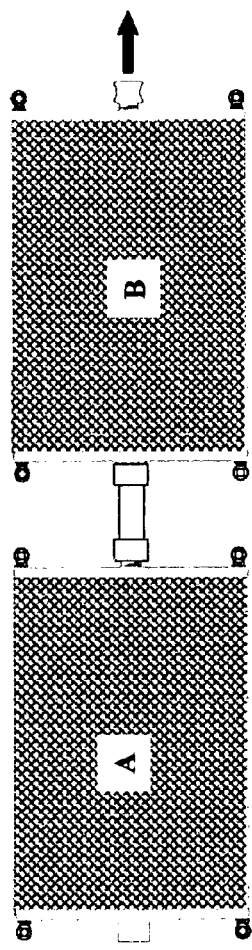
FIGS. 9A and 9B are exemplary illustrations of one or more aquatic extraction and filtration device coupled with one another in series and/or in parallel combinations in accordance with the present invention.
Figure 9B:
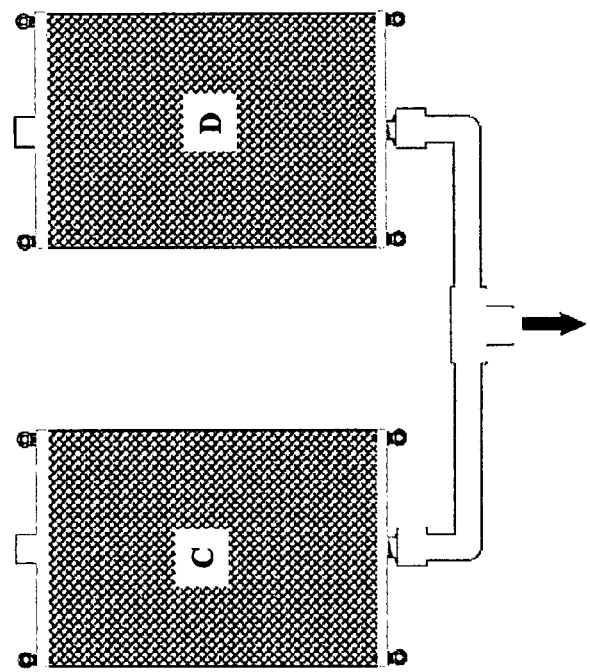

FIGS. 9A and 9B are exemplary illustrations of one or more aquatic extraction and filtration device 100 coupled with one another in series and in parallel combinations. Each device 100 must be oriented in a specified direction dictated by the internal plumbing. That is, as was described in relation to FIG. 8, the internal plumbing, in particular, the main pipes 540 and 532 have a set of openings that progressively increase in size, with the smallest opening at one end (proximal the pump), and the largest at the other (distal from the pump). The direction in which the aquatic extraction and filtration device 100 is oriented for connection between a water source and the pump is that the largest sized opening must be distal from the pump, and the smallest must be proximal to the pump. This configuration applies to one or multiple series or parallel connections of device 100.

As illustrated, multiple screens can be joined together in series (FIG. 9A) and or parallel (FIG. 9B), the series configuration reduces the need for frequent cleansing in high debris water sources, the parallel configuration, plumbed with manifold in multiples, will allow larger volume pumps to be used with the same size screen. With series configuration, the need for frequent cleaning is reduced because if screen "A" on the aquatic extraction and filtration device 100 becomes clogged with dirt and debris, most of the water suction will be compensated through screen "B" of the second series connected aquatic extraction and filtration device 100. In other words, one of the clean screens "A" or "B" will take over the slack from the other screen "A" or "B" that is clogged. For example, the more clogged the aquatic extraction and filtration device "A" becomes, the more water will be removed from the other aquatic extraction and filtration device "B." It should be noted that the flow rate of water into the pump would remain the same (balanced) due to the series connection of the two aquatic extraction and filtration devices "A" and "B." It should be apparent to those skilled in the art that the embodiment illustrated and described in FIGS. 7E to 7H cannot be used in the series connection as the first unit (the unit coupled closest to the pump, in this instance, unit "B"). The end unit (unit "A") can use any of the embodiments illustrated in FIGS. 7A to 7H in the series connection. With parallel connections, if one of the aquatic extraction and filtration systems "C" or "D" becomes clogged, then the total rate of water flow pumped would be reduced by the amount that the clogged aquatic extraction and filtration device ("C" or "D") was extracting water. Although not illustrated, it should readily be apparent to those skilled in the art that any combination or permutations of parallel and or series connection of the aquatic extraction and filtration devices can be made. Hence, for example, the aquatic extraction and filtration devices "C" and "D" can each have additional series connected aquatic extraction and filtration devices, making a parallel/series combination.

It should be noted that cleaning the screen 202 of debris build up is accomplished easily by back flushing the device from the water storage tanks or bladders, by adding a gated "Y" to the intake hose and connecting a hose to the discharge side of the pump, and pumping from the storage. This will blast the screen clean. It should further be noted that there are no moving parts to ware, and no internal parts that could break and become ingested into the pump, damaging vital component parts.

Figures 10A, 10B:
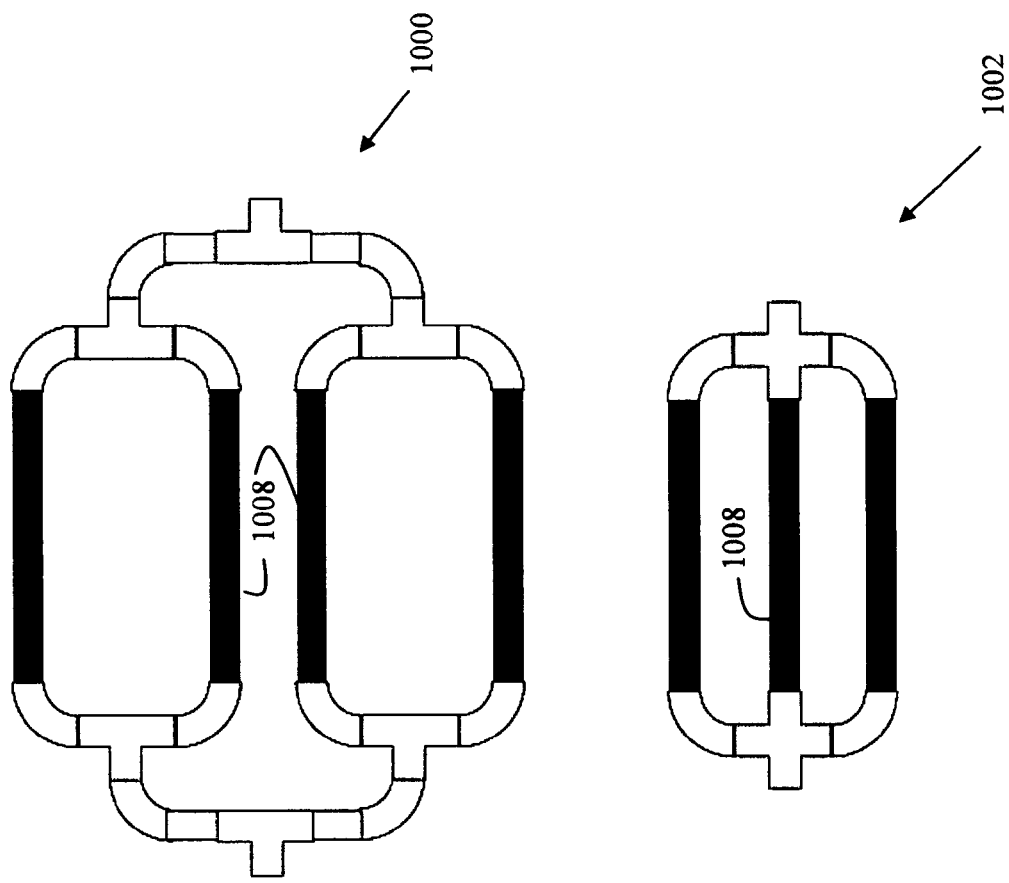
FIGS. 10A, 10B, and 10C are exemplary illustrations of alternative embodiments for various configurations of the inner plumbing of the aquatic extraction and filtration device that use plurality of parallel tubes in accordance with the present invention.
Figure 10C:
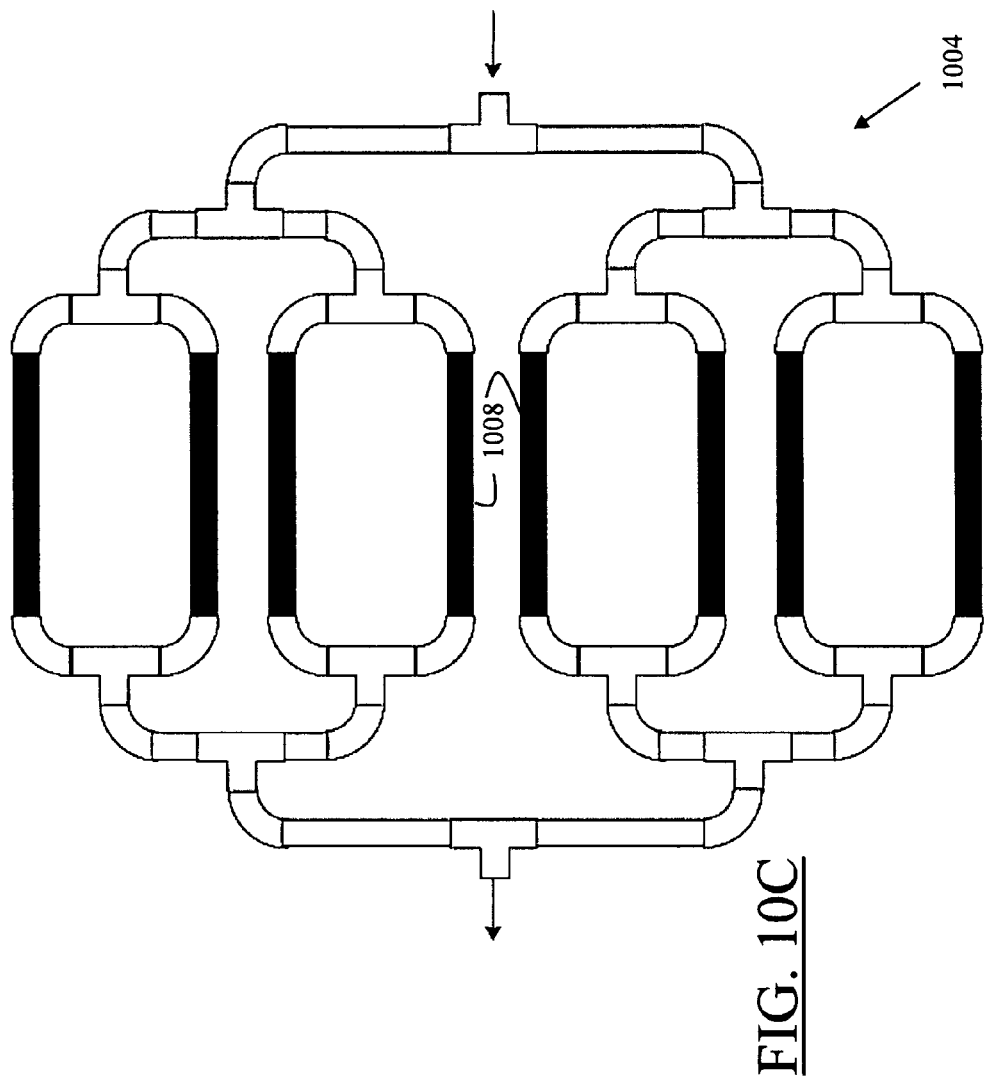

FIGS. 10A, 10B, and 10C are exemplary illustrations of alternative embodiments for various configurations of the inner plumbing of the respective aquatic extraction and filtration devices 1000, 1002, and 1004, where instead of using the preferred two main straight pipes 540 and 532, a plurality thereof is used. Hence, as illustrated, a variety of plumbing configurations may be attained by attaching the straight pipes in pairs or gangs. However, it is preferable to use two straight pipes rather than a plurality thereof. The use of two straight pipes as illustrated in the previous figures will produce a "captive" area for the water flow, and produce the greatest disturbance to reduce turbulence. The use of a center pipes 1008 will create a hot spot because in general, water tends to move in a straight direction, therefore, water will be sucked into the pump mainly through the center tube, leaving the others underutilized, thereby creating a hot spot surrounding the center tubes (and the central portion of the aquatic extraction and filtration device 100). With respect to the configurations 1000 and 1004, substantial space is used that is wasted, without much advantage.

FIGS. 11A to 11L are exemplary illustrations that map the various orientations and sizes of the slots or apertures for the various embodiments for the plumbing system for different embodiments of the aquatic extraction and filtration device 100 illustrated in FIGS. 1A to 10C. Orientation and sizes of the slots dictate the flow rate and direction of water into the slotted pipes, with the goal of equalizing the flow rate over the entire screen area. Accordingly, FIGS. 11A to 11L provide a mapping for an exemplary set of slot orientation and size for different embodiments of the aquatic extraction and filtration device 100.

Figure 11A:
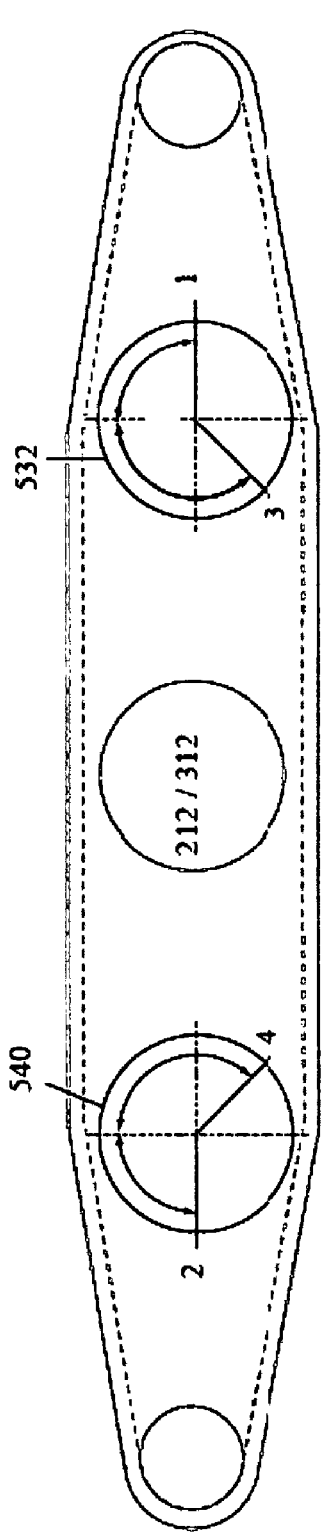
FIGS. 11A to 11L are exemplary illustrations that map the various orientations of the slots or apertures for the various embodiments for the plumbing systems for different embodiments of the aquatic extraction and filtration device illustrated in FIGS. 10A to 10C in accordance with the present invention.

FIG. 11A is an exemplary cross-sectional illustration of the aquatic extraction and filtration device 100 with a bottom pan 338, having a preferred two pipe configuration showing exemplary slot location angles (also illustrated and described above with respect to FIGS. 1A to 9B). As illustrated, with this preferred exemplary embodiment, a first set of slots "1" and "2" on pipes 540 and 532 face the exterior of the enclosure juxtaposed proximal the curved or rounded lateral edges 214 and 216, and are oriented at an angle $\lambda$ degrees orientation, with an exemplary value of about 0°/180°. The second set of slots "3" and "4" face the interior of the screen enclosure, and are oriented at $\phi$ degrees, with an exemplary value of 45 degrees (+/−) from the 0°/18.0° reference. It should be noted that within the context of FIGS. 11A to 11L, each set of slots illustrated (e.g., set of slots "1") includes a plurality of individual slots aligned along the axial length of a pipe.

Figure 11B:
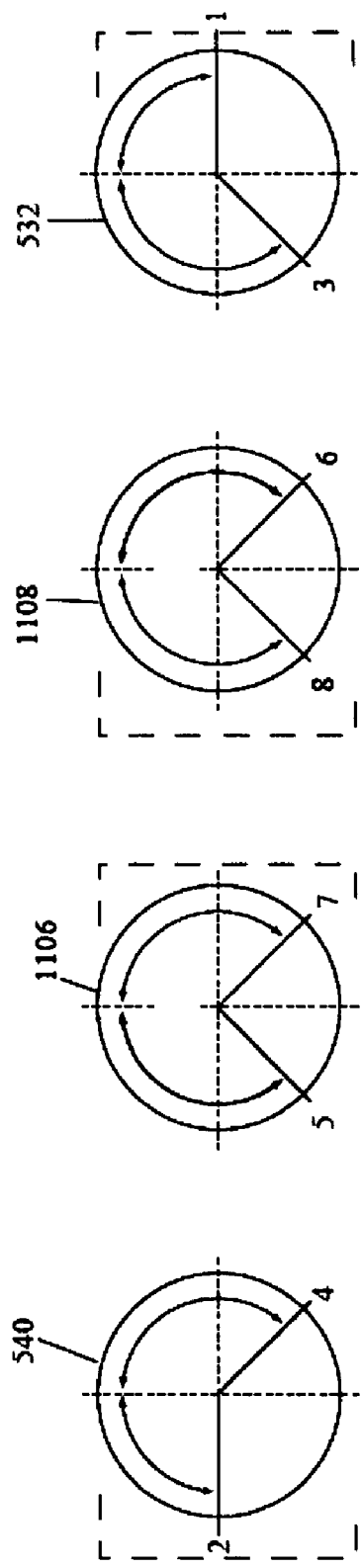

FIG. 11B is an exemplary cross-sectional illustration of the aquatic extraction and filtration device 100 with a bottom pan having a four pipe configuration (illustrated in FIG. 10A) exemplary showing slot location angles. The four pipe configuration illustrated includes similar corresponding or equivalent components as the two pipe configuration that is shown in FIG. 11A, and described above. Therefore, for the sake of brevity, clarity, convenience, and to avoid duplication, the general description of FIG. 11B will not repeat every corresponding or equivalent component that has already been described above in relation to the two pipe configuration that is shown in FIG. 11A. As illustrated, with this exemplary embodiment, the two interior pipes 1106 and 1108 include respective distal slots "5" and "6" that are oriented at an angle $\phi$ degrees orientation, with an exemplary value of 45 degrees (+/−) from the 0°/180° reference. The interior pipes 1106 and 1108 further include respective proximal slots "7" and "8" that are also oriented at an angle $\phi$ degrees orientation, with an exemplary value of 45 degrees (+/−) from the 0°/180° reference.

Figure 11C:
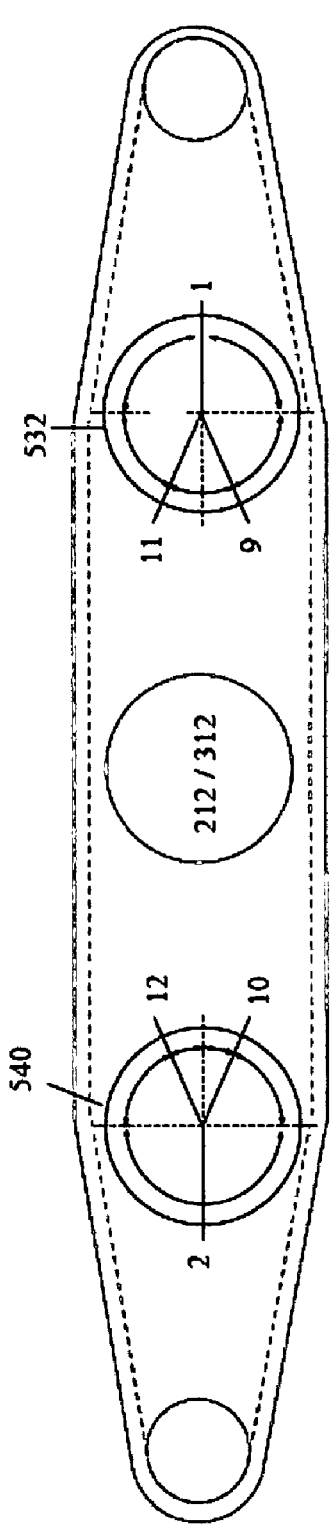

FIG. 11C is an exemplary cross-sectional illustration of the aquatic extraction and filtration devices 100 without a bottom pan having a two pipe configuration showing exemplary slot location angles (also illustrated and described above with respect to FIGS. 1A to 9B, and 11A). As illustrated, with this exemplary embodiment, a first set of slots "1" and "2" on pipes 1104 and 1102 face the exterior of the enclosure juxtaposed proximal the curved or rounded lateral edges 214 and 216, and are oriented at an angle $\lambda$ degrees orientation, with an exemplary value of about 0°/180°. The second set of slots "9" and "10" face the interior of the screen enclosure, and are oriented at $\gamma$ degrees, with an exemplary value of 22.5 degrees (+/−) from the 0°/180° reference. The final set of slots "11" and "12" face the interior of the screen enclosure, and are oriented at $\delta$ degrees, with an exemplary value of 22.5 degrees (+/−) from the 0°/180° reference.

Figure 11D:
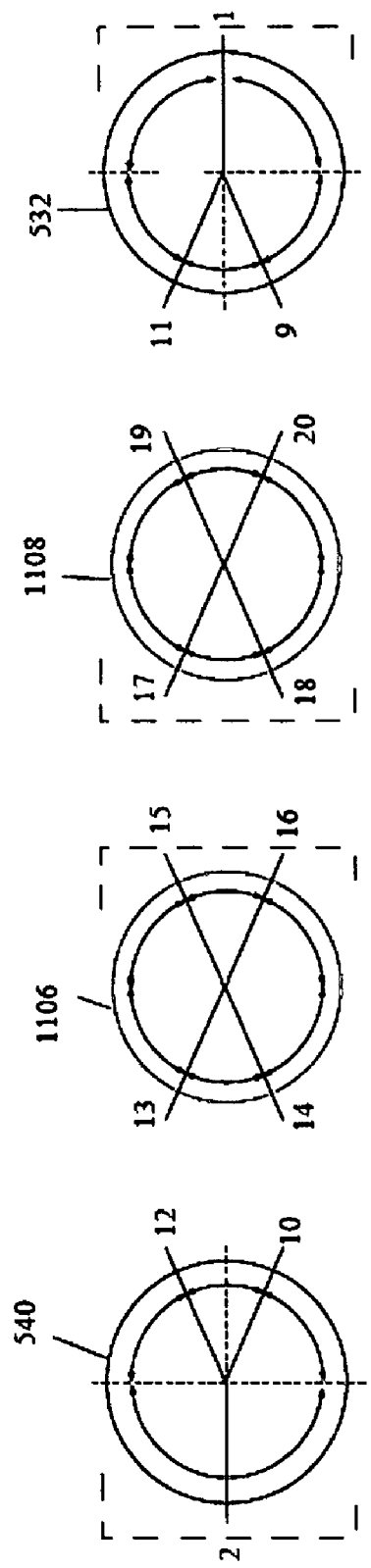

FIG. 11D is an exemplary cross-sectional illustration of the aquatic extraction and filtration device 100 without a bottom pan having a four pipe configuration (illustrated in FIG. 10A) showing exemplary slot location angles. The four pipe configuration without the bottom pan includes similar corresponding or equivalent components as the two pipe configuration that is shown in FIG. 11C, and described above. Therefore, for the sake of brevity, clarity, convenience, and to avoid duplication, the general description of FIG. 11D will not repeat every corresponding or equivalent component that has already been described above in relation to the four-pipe configuration without the bottom pan that is shown in FIG. 11C. As illustrated, with this exemplary embodiment, the two interior pipes 1106 and 1108 include four sets of slots (with each set including a plurality of slots aligned along the axial length of the pipes), including slots sets "13," "14," "15," "16," "17," "18," "9," and "20" are oriented at an angle $\eta$ degrees orientation, with an exemplary value of 11.25 degrees (+/−) from the 0°/180° reference. In other words, the pairs of set of slots 13 and 14, 15 and 16, 17 and 18, and 19 and 20 have an exemplary 22.5 degree separation.

It should be noted that the size of each individual slot is decreased commensurately as the number of slots increases. This is to maintain the aggregate size of the individual slots equal to the cross-sectional diameter of the pipe. Increasing the sizes of the slots (or maintaining their size, and increasing their number) so that the collective total size of the slot openings is larger than that of the cross-sectional diameter of the pip does not provide additional advantage because the amount of water moved through the pipe will continue to be limited by the cross-sectional diameter size of the pipe, no matter how many or how large of slots. Therefore, the total, collective opening size of the slots (regardless of number of slots) should at most equal to that of the cross-sectional diameter of the pipe. Accordingly, for example, if the number of slots is doubled (in case of pipes 1106 and 1108 illustrated in FIG. 11D versus that which is illustrated in FIG. 11B), the size of each slot within the set of slots should be reduced by a half.

Figure 11E:
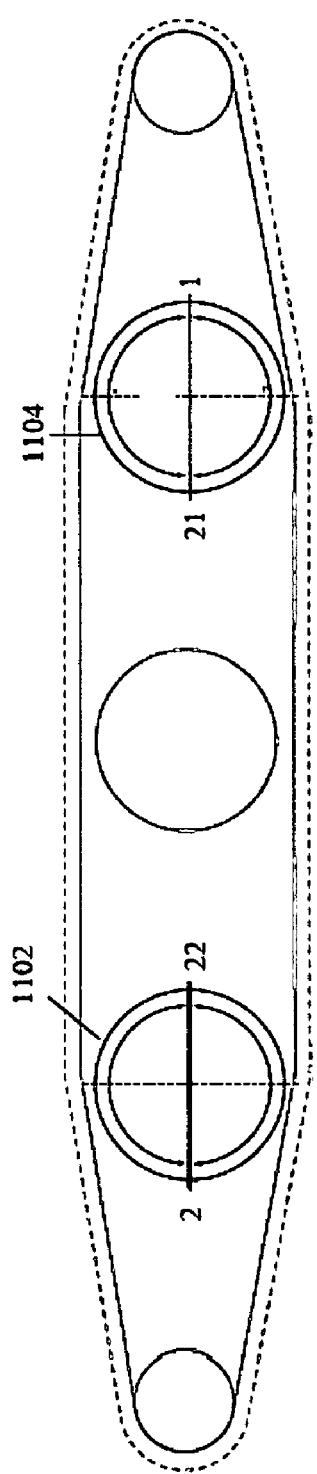

FIG. 11E is an exemplary cross-sectional illustration of the aquatic extraction and filtration device 100 without a bottom pan having a two pipe configuration (illustrated in FIG. 10A) showing exemplary slot location angles. As illustrated, with this exemplary embodiment, a first set of slots "1" and "2" on pipes 1104 and 1102 face the exterior of the enclosure juxtaposed proximal the curved or rounded lateral edges 214 and 216, and are oriented at an angle λ degrees orientation, with an exemplary value of about 0°/180°. The second set of slots "21" and "22" face the interior of the screen enclosure, and are oriented at ζ degrees, with an exemplary value of 0°/180°.

Figure 11F:
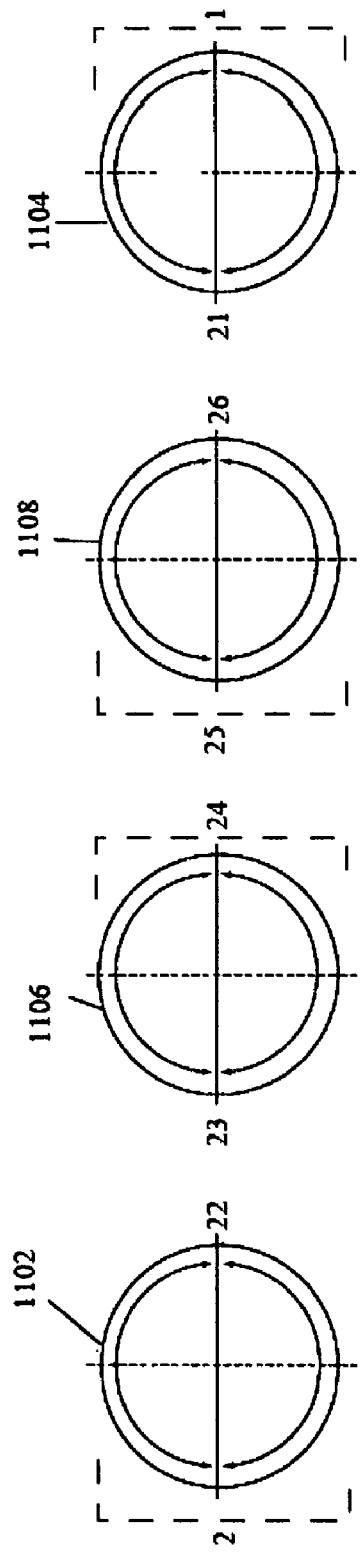

FIG. 11F is an exemplary cross-sectional illustration of the aquatic extraction and filtration device 100 without a bottom pan having a four pipe configuration (illustrated in FIG. 10A) showing exemplary slot location angles. The four pipe configuration without a bottom pan includes similar corresponding or equivalent components as the two pipe configuration that is shown in FIG. 11E, and described above. Therefore, for the sake of brevity, clarity, convenience, and to avoid duplication, the general description of FIG. 11F will not repeat every corresponding or equivalent component that has already been described above in relation to the two pipe configuration that is shown in FIG. 11E. As illustrated, with this exemplary embodiment, the two interior pipes 1106 and 1108 include two sets of slots (with each set including a plurality of slots aligned along the axial length of the pipes), including slots sets "23," "24," "25," and "26" that are oriented at an angle ζ degrees orientation, with an exemplary value of 0°/180°.

Figure 11G:
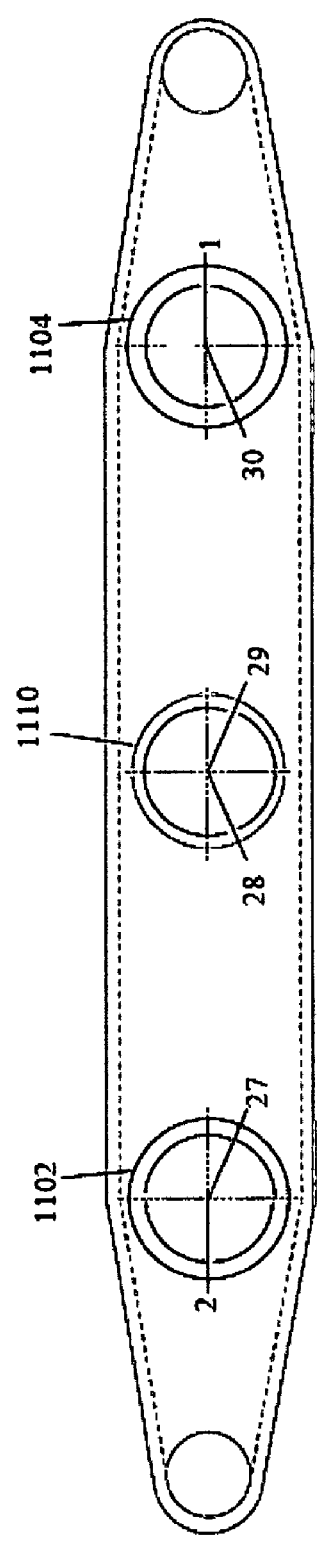

FIG. 11G is an exemplary cross-sectional illustration of the aquatic extraction and filtration device 100 with a bottom pan having a three pipe configuration (illustrated in FIG. 10B) showing exemplary slot location angles. As illustrated, with this exemplary embodiment, a first set of slots "1" and "2" on pipes 1104 and 1102 face the exterior of the enclosure juxtaposed proximal the curved or rounded lateral edges 214 and 216, and are oriented at an angle λ degrees orientation, with an exemplary value of about 0°/180°. The second set of slots "27" and "30" face the interior of the screen enclosure, and are oriented at δ degrees, with an exemplary value of 22.5 degrees (+/−) from the 0°/180° reference. The sets of slots 28 and 29 for pipe 1110 are also oriented at δ degrees, with an exemplary value of 22.5 degrees (+/−) from the 0°/180° reference.

Figure 11H:
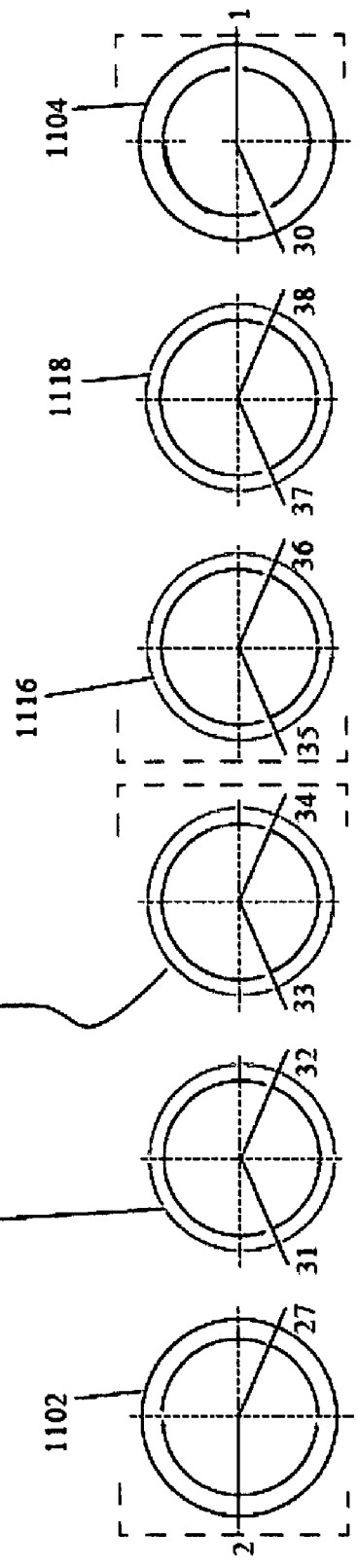

FIG. 11H is an exemplary cross-sectional illustration of the aquatic extraction and filtration device 100 with a bottom pan having a six pipe configuration showing exemplary slot location angles. The six pipe configuration with the bottom pan includes similar corresponding or equivalent components as the three pipe configuration that is shown in FIG. 11G, and described above. Therefore, for the sake of brevity, clarity, convenience, and to avoid duplication, the general description of FIG. 11H will not repeat every corresponding or equivalent component that has already been described above in relation to the three pipe configuration that is shown in FIG. 10G. As illustrated, with this exemplary embodiment, each of the four interior pipes 1112 to 1118 include two sets of slots (with each set including a plurality of slots aligned along the axial length of the pipes), including slots sets "31" to "38" that are oriented at an angle δ degrees orientation, with an exemplary value 22.5 degrees from 0°/180° reference.

Figure 11I:
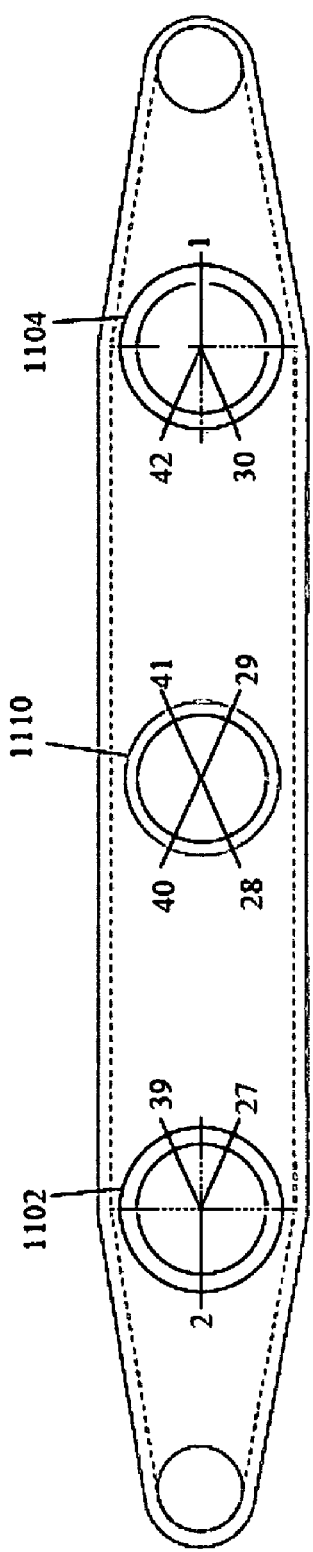

FIG. 11I is an exemplary cross-sectional illustration of the aquatic extraction and filtration device 100 without a bottom pan having a three pipe configuration (illustrated in FIG. 10B) showing exemplary slot location angles. As illustrated, with this exemplary embodiment, a first set of slots "1" and "2" on pipes 1104 and 1102 face the exterior of the enclosure juxtaposed proximal the curved or rounded lateral edges 214 and 216, and are oriented at an angle λ degrees orientation, with an exemplary value of about 0°/180°. The second sets of slots "27," "30," "39," and "42" face the interior of the screen enclosure, and are oriented at δ degrees, with an exemplary value of 22.5 degrees (+/−) from the 0°/180° reference. The sets of slots "28," "29," "40," and "41" for pipe 1110 are also oriented at δ degrees, with an exemplary value of 22.5 degrees (+/−) from the 0°/180° reference. That is, the difference in angle between the internally oriented slots is approximately 45° or so.

Figure 11J:
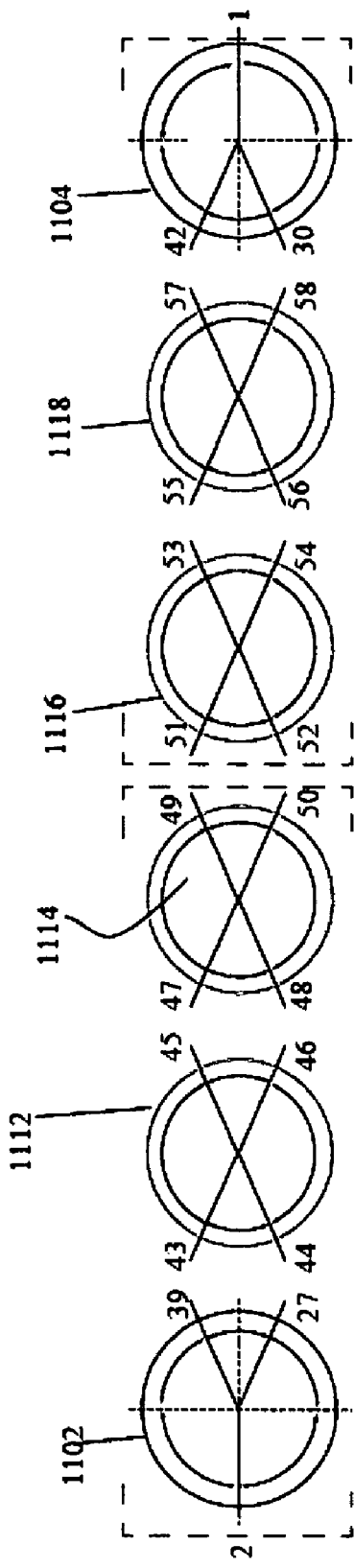

FIG. 11J is an exemplary cross-sectional illustration of the aquatic extraction and filtration device 100 without a bottom pan having a six pipe configuration showing exemplary slot location angles. The six pipe configuration without the bottom pan includes similar corresponding or equivalent components as the three pipe configuration that is shown in FIG. 11I, and described above. Therefore, for the sake of brevity, clarity, convenience, and to avoid duplication, the general description of FIG. 11J will not repeat every corresponding or equivalent component that has already been described above in relation to the three pipe configuration that is shown in FIG. 11I. As illustrated, with this exemplary embodiment, each of the four interior pipes 1112 to 1118 include four sets of slots (with each set including a plurality of slots aligned along the axial length of the pipes), including slots sets "43" to "58" that are oriented at an angle δ degrees orientation, with an exemplary value 22.5 degrees from 0°/180° reference. That is, the difference in angle between the sets of slots on each pipe is approximately 45° or so.

Figure 11K:
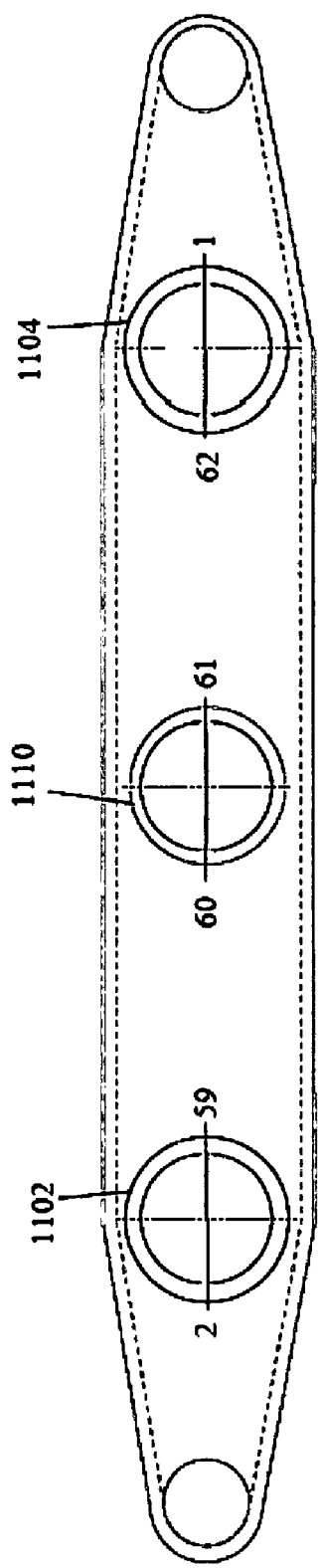

FIG. 11K is an exemplary cross-sectional illustration of the aquatic extraction and filtration device 100 without a bottom pan having a three pipe configuration (illustrated in FIG. 10B) showing exemplary slot location angles. As illustrated, with this exemplary embodiment, a first set of slots "1" and "2" on pipes 1104 and 1102 face the exterior of the enclosure juxtaposed proximal the curved or rounded lateral edges 214 and 216, and are oriented at an angle λ degrees orientation, with an exemplary value of about 0°/180°. The second sets of slots "59" and "62" face the interior of the screen enclosure, and are oriented also at λ degrees, with an exemplary value of about 0°/180°. The sets of slots "60" and "61" for pipe 1110 are also oriented at λ degrees, with an exemplary value of about 0°/180° reference.

Figure 11L:
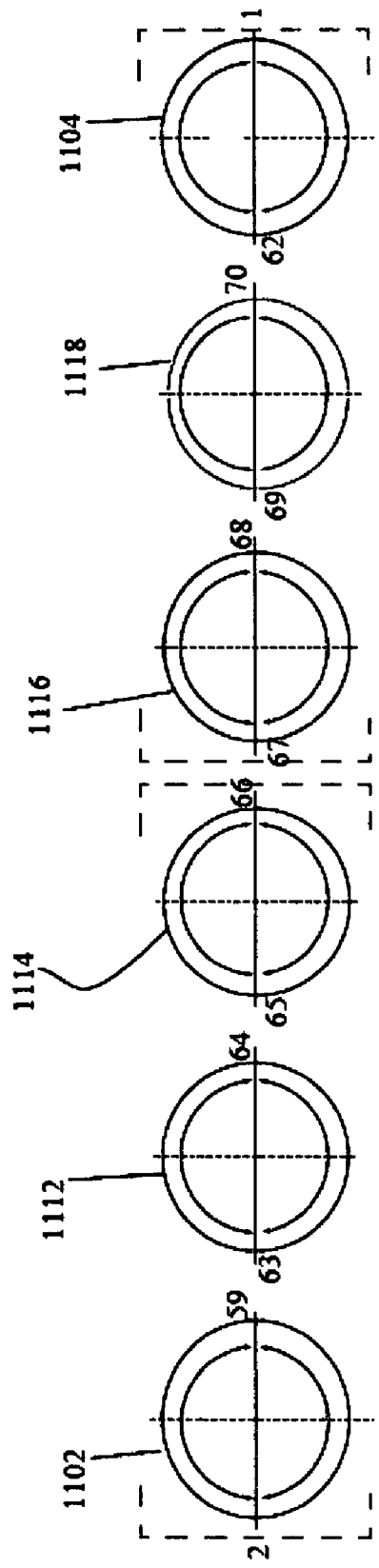

FIG. 11L is an exemplary cross-sectional illustration of the aquatic extraction and filtration device 100 without a bottom pan having a six-pipe configuration showing exemplary slot location angles. The six-pipe configuration without the bottom pan includes similar corresponding or equivalent components as the three pipe configuration that is shown in FIG. 11K, and described above. Therefore, for the sake of brevity, clarity, convenience, and to avoid duplication, the general description of FIG. 11L will not repeat every corresponding or equivalent component that has already been described above in relation to the three-pipe configuration that is shown in FIG. 11K. As illustrated, with this exemplary embodiment, each of the four interior pipes 1112 to 1118 include two sets of slots (with each set including a plurality of slots aligned along the axial length of the pipes), including slots sets "63" to "70" that are oriented at an angle λ degrees orientation, with an exemplary value about 0°/180°.

Accordingly, one aspect of the invention is that it protects aquatic life from being impaled on the screening device, or ingested into the pumps, while pumping water from streams, lakes or other body of water. The internal plumbing distributes the intake flow over the entire area of the screen, balancing approach velocities and eliminating "hotspots" that could impale aquatic life. The invention's low profile enables water to be pumped from very shallow water sources, certain jurisdictional requirements state that the depth of the water must be 2 times the thickness of the device at a minimum, allowing for a buffer zone of water above the device. The lightweight, portability and small profile makes the aquatic extraction and filtration device 100 easy to use and transport. The present invention will be effective in the exploitation of most available water sources, allowing more water to be pumped, increasing the safety factor, and reducing risk to life and property. Equipment and labor expenses will be reduced as a result of the increased efficiency afforded by aquatic extraction and filtration device 100.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, the number and sizes of the various components mentioned may be varied. Increasing the size of the screen 202 will enable the use of a stronger and more powerful pumping action to extract more gallons of water per time, without an increase in the rate of flow of water impinging on the screen. The dimensions of the slots, their orientation, and their distances with respect to one another may be varied to reduce or increase the flow rates, using the same or different size screen for different applications of the filtering system. Accordingly, dimensions of any of the components mentioned may easily be varied to accommodate an increase or a decrease in the amount of water pumped per time, in view of the requirement that the flow rate of water (or "approach velocity") impinging against the screen of the aquatic filtration device remain within a pre-set amount. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section §112, Paragraph 6. In particular, the use of "step of," "act of," "operation of," or "operational act of" in the claims herein is not intended to invoke the provisions of 35 U.S.C. §112, Paragraph 6.

What is claimed is:

1. An aquatic extraction and filtration device, comprising:
    a portable frame, the portable frame including a set of compression supports and a set of lateral structural posts, with the set of compression supports and the set of lateral structural posts forming an axial length of the portable frame, and a set of bulkheads transversely coupled with the set of compression supports and the set of lateral structural, with the bulkheads forming a width of the portable frame, the set of compression supports including hollow tubes and an associated set of first fasteners inserted through the hollow tubes for fastening the set of compression supports with the set of bulkheads;
    piping coupled with the portable frame; and
    a screen enclosing the portable frame and the piping.

2. The aquatic extraction and filtration device as set forth in claim 1, further comprising:
    a pan coupled with the screen.

3. The aquatic extraction and filtration device as set forth in claim 1, wherein:
    the set of first fasteners are comprised of all-thread, and are coupled with the set of bulkheads by nuts.

4. The aquatic extraction and filtration device as set forth in claim 1, wherein:
    the set of bulkheads are comprised of a groove for securing the screen therein;
    the groove is proximal along an inside periphery edge of the set of bulkheads allowing transversely oriented edges of the screen along the width of the portable frame to be inserted within the groove of the set of bulkheads.

5. The aquatic extraction and filtration device as set forth in claim 1, wherein:
    the piping is comprised of two main pipes that are oriented longitudinally along an axial length of the portable frame, with each pipe including two sets of slots aligned along an axial length of the pipes;
    a first set of slots of the two sets of slots face an exterior of the portable frame juxtaposed proximal lateral edges of the portable frame and are oriented at an angle λ degrees;
    a second set of slots of the two sets of slots face an interior of portable frame and are oriented at angle φ degrees; and
    the first set of slots and the second set of slots are comprised of different sizes, with larger size slots placed away from a suction end coupled with a pumping unit for equalizing a suction velocity across an entire area of the screen, eliminating high flow areas that might impinge aquatic life.

* * * * *